US011937137B2

(12) United States Patent
Zhang et al.

(10) Patent No.: US 11,937,137 B2
(45) Date of Patent: Mar. 19, 2024

(54) PHYSICAL LAYER MEASUREMENT WITHOUT REPORTING FOR USER EQUIPMENT MOBILITY

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/154,799

(22) Filed: Jan. 21, 2021

(65) Prior Publication Data

US 2021/0235338 A1  Jul. 29, 2021

Related U.S. Application Data

(60) Provisional application No. 62/965,703, filed on Jan. 24, 2020.

(51) Int. Cl.
*H04W 36/00* (2009.01)
*H04W 24/08* (2009.01)

(52) U.S. Cl.
CPC ....... *H04W 36/0085* (2018.08); *H04W 24/08* (2013.01)

(58) Field of Classification Search
None
See application file for complete search history.

(56) References Cited

U.S. PATENT DOCUMENTS

2019/0313301 A1  10/2019  Cedergren et al.
2019/0320355 A1*  10/2019  Da Silva ............... H04L 1/0026
(Continued)

FOREIGN PATENT DOCUMENTS

| CN | 110636574 A | 12/2019 |
| WO | WO-2019160655 A1 | 8/2019 |
| WO | WO-2020118016 | 6/2020 |

OTHER PUBLICATIONS

Huawei, et al., "Some Physical Layer Aspects of Random Access for Handover", 3GPP TSG-RAN WG2 #98, 3GPP Draft; R2-1704845, 3rd Generation Partnership Project (3GPP), Mobile Competence Centre; 650, Route Des Lucioles; F-06921 Sophia-Antipolis Cedex; France, vol. RAN WG2, no. Hangzhou, China; May 15, 2017-May 19, 2017, 3 Pages, May 14, 2017 (May 14, 2017), XP051275361, Retrieved from the Internet: URL: http://www.3gpp.org/ftp/Meetings_3GPP_SYNC/RAN2/Docs/ [retrieved on May 14, 2017] section 2.2.

(Continued)

*Primary Examiner* — Saad Khawar
(74) *Attorney, Agent, or Firm* — Holland & Hart LLP

(57) ABSTRACT

Methods, systems, and devices for wireless communications are described in which a user equipment (UE) may measure physical layer parameters of one or more reference signals transmitted by one or more non-serving or neighbor base stations. The UE may store the measured physical layer parameters and, in the event that a handover command is received from a source base station to establish a connection with a target base station of one of the neighbor base stations, use the measured physical layer parameters for an uplink communication with the target base station, where the measured physical layer parameters are unreported by the UE prior to establishing the connection with the target base station.

34 Claims, 16 Drawing Sheets

(56) References Cited

U.S. PATENT DOCUMENTS

2020/0404690 A1* 12/2020 Lee .................. H04L 5/001
2021/0044401 A1*  2/2021 Yoon ................ H04B 7/088
2021/0377892 A1* 12/2021 Chen ............... H04W 56/001
2022/0070025 A1*  3/2022 Ko .................. H04L 25/0204

OTHER PUBLICATIONS

International Search Report and Written Opinion—PCT/US2021/014718—ISA/EPO—dated May 7, 2021.

* cited by examiner

PHYSICAL LAYER MEASUREMENT WITHOUT REPORTING FOR USER EQUIPMENT MOBILITY

CROSS REFERENCE

The present Application for Patent claims the benefit of U.S. Provisional Patent Application No. 62/965,703 by ZHANG et al., entitled "PHYSICAL LAYER MEASUREMENT WITHOUT REPORTING FOR USER EQUIPMENT MOBILITY," filed Jan. 24, 2020, assigned to the assignee hereof, and expressly incorporated by reference herein.

FIELD OF TECHNOLOGY

The following relates generally to wireless communications and more specifically to physical layer measurement without reporting for user equipment (UE) mobility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a UE may communicate with a base station (referred to as a source base station) as part of an active connection on a selected serving cell in a wireless communications system, and may experience degraded signal quality or reduced signal power due to signaling interference or mobility within the wireless communication system. Based on the variation in signal quality or signal power, the UE may request or be instructed to synchronize with a target cell and handover communication from the source base station to another base station (referred to as a target base station) within the wireless communications system. Such handover techniques of UEs between different base stations may increase latency and decrease reliability of wireless communications.

SUMMARY

The described techniques relate to improved methods, systems, devices, and apparatuses that support physical layer measurement without reporting results thereof for user equipment (UE) mobility. Various aspects of the present disclosure enable a UE to measure physical layer parameters (e.g., Layer 1 (L1) parameters) of one or more reference signals (RSs), which may be transmitted by one or more non-serving or neighbor base stations. The UE may store the measured physical layer parameters and, in the event that a handover command is received from a source base station to establish a connection with a target base station of one of the neighbor base stations, use the measured physical layer parameters for communications (e.g., uplink or downlink) with the target base station. In such instances, the measured physical layer parameters may be unreported by the UE prior to establishing the connection with the target base station. In some cases, the source base station may provide an indication of time and frequency resources that the UE is to monitor for RSs of the neighbor base stations. In some cases, the RSs include one or more of tracking RSs (TRSs) or channel state information RSs (CSI-RSs). The measured physical layer parameters may include, for example, one or more of timing error, frequency error, one or more time/frequency offset values, beam refinement measurements, or any combinations thereof, that are based on RS measurements from the neighbor base stations.

A method for wireless communication at a UE is described. The method may include receiving, from a source base station using a first connection that is established between the source base station and the UE, an indication to measure one or more physical layer parameters of one or more RS transmissions of one or more neighboring base stations, measuring the one or more physical layer parameters of the one or more RS transmissions of the one or more neighboring base stations to generate one or more physical layer measurements associated with the one or more neighboring base stations, and storing the one or more physical layer measurements at the UE for use in establishing a second connection with a target base station selected from the one or more neighboring base stations, where the one or more physical layer measurements are unreported prior to establishing the second connection.

An apparatus for wireless communication at a UE is described. The apparatus may include a processor, memory in electronic communication with the processor, and instructions stored in the memory. The instructions may be executable by the processor to cause the apparatus to receive, from a source base station using a first connection that is established between the source base station and the UE, an indication to measure one or more physical layer parameters of one or more RS transmissions of one or more neighboring base stations, measure the one or more physical layer parameters of the one or more RS transmissions of the one or more neighboring base stations to generate one or more physical layer measurements associated with the one or more neighboring base stations, and store the one or more physical layer measurements at the UE for use in establishing a second connection with a target base station selected from the one or more neighboring base stations, where the one or more physical layer measurements are unreported prior to establishing the second connection.

Another apparatus for wireless communication at a UE is described. The apparatus may include means for receiving, from a source base station using a first connection that is established between the source base station and the UE, an indication to measure one or more physical layer parameters of one or more RS transmissions of one or more neighboring base stations, means for measuring the one or more physical layer parameters of the one or more RS transmissions of the one or more neighboring base stations to generate one or more physical layer measurements associated with the one or more neighboring base stations, and means for storing the one or more physical layer measurements at the UE for use in establishing a second connection with a target base station selected from the one or more neighboring base stations, where the one or more physical layer measurements are unreported prior to establishing the second connection.

A non-transitory computer-readable medium storing code for wireless communication at a UE is described. The code may include instructions executable by a processor to receive, from a source base station using a first connection that is established between the source base station and the UE, an indication to measure one or more physical layer parameters of one or more RS transmissions of one or more neighboring base stations, measure the one or more physical layer parameters of the one or more RS transmissions of the one or more neighboring base stations to generate one or more physical layer measurements associated with the one or more neighboring base stations, and store the one or more physical layer measurements at the UE for use in establishing a second connection with a target base station selected from the one or more neighboring base stations, where the one or more physical layer measurements are unreported prior to establishing the second connection.

Some examples of the method, apparatuses, and non-transitory computer-readable medium described herein may further include operations, features, means, or instructions for receiving a handover command from the source base station to initiate a handover procedure to establish the second connection with the target base station and transmitting, responsive to the handover command, one or more uplink communications to the target base station based on the one or more physical layer measurements.

In some examples of the method, apparatuses, and non-transitory computer-readable medium described herein, the one or more RS transmissions of the one or more neighboring base stations may be transmitted using time and frequency resources that may be indicated by the source base station.

In some examples of the method, apparatuses, and non-transitory computer-readable medium described herein, the one or more RS transmissions include a TRS transmitted by the one or more neighboring base stations, and the one or more physical layer measurements include at least part of time offset measurements, frequency offset measurements, or combinations thereof, that may be based on the TRS.

In some examples of the method, apparatuses, and non-transitory computer-readable medium described herein, the TRS may be a periodic or semi-persistent TRS transmitted by the one or more neighboring base stations using time and frequency resources indicated to the UE by the source base station.

In some examples of the method, apparatuses, and non-transitory computer-readable medium described herein, the TRS may be an aperiodic TRS that may be transmitted in a same downlink transmission that may be used to indicate to the UE to select the target base station for a handover procedure.

In some examples of the method, apparatuses, and non-transitory computer-readable medium described herein, the one or more RS transmissions include a CSI-RS transmitted by the one or more neighboring base stations in a selected beam, and the one or more physical layer measurements include at least part of beam refinement measurements for one or more beamforming parameters associated with the selected beam that may be based on the CSI-RS.

In some examples of the method, apparatuses, and non-transitory computer-readable medium described herein, the selected beam may be quasi co-located (QCL) with a preferred synchronization signal block (SSB) of each of the one or more neighboring base stations that may be reported by the UE to the source base station.

In some examples of the method, apparatuses, and non-transitory computer-readable medium described herein, the CSI-RS may be a periodic or semi-persistent CSI-RS transmitted by the one or more neighboring base stations using time and frequency resources indicated to the UE by the source base station.

In some examples of the method, apparatuses, and non-transitory computer-readable medium described herein, the CSI-RS may be an aperiodic CSI-RS that may be transmitted in a same downlink transmission that may be used to indicate to the UE to select the target base station for a handover procedure.

In some examples of the method, apparatuses, and non-transitory computer-readable medium described herein, the CSI-RS includes a repetition parameter that may be set to ON to indicate that measurements of the CSI-RS may be to be unreported by the UE.

A method for wireless communication at a source base station is described. The method may include identifying one or more neighboring base stations as candidates for a handover of a UE from the source base station, determining one or more sets of RS resources for transmission of one or more RSs by the one or more neighboring base stations, transmitting, to the UE using a first connection that is established between the source base station and the UE, an indication to measure the one or more sets of RS resources that are available for physical layer measurements at the UE of the one or more RSs transmitted by the one or more neighboring base stations, and transmitting, without receiving a measurement report associated with the physical layer measurements at the UE related to the one or more reference signals transmitted by the one or more neighboring base stations, a handover command to the UE to establish a second connection with a target base station of the one or more neighboring base stations.

An apparatus for wireless communication at a source base station is described. The apparatus may include a processor, memory in electronic communication with the processor, and instructions stored in the memory. The instructions may be executable by the processor to cause the apparatus to identify one or more neighboring base stations as candidates for a handover of a UE from the source base station, determine one or more sets of RS resources for transmission of one or more RSs by the one or more neighboring base stations, transmit, to the UE using a first connection that is established between the source base station and the UE, an indication to measure the one or more sets of RS resources that are available for physical layer measurements at the UE of the one or more RSs transmitted by the one or more neighboring base stations, and transmit, without receiving a measurement report associated with the physical layer measurements at the UE related to the one or more reference signals transmitted by the one or more neighboring base stations, a handover command to the UE to establish a second connection with a target base station of the one or more neighboring base stations.

Another apparatus for wireless communication at a source base station is described. The apparatus may include means for identifying one or more neighboring base stations as candidates for a handover of a UE from the source base station, means for determining one or more sets of RS resources for transmission of one or more RSs by the one or more neighboring base stations, means for transmitting, to the UE using a first connection that is established between the source base station and the UE, an indication to measure the one or more sets of RS resources that are available for physical layer measurements at the UE of the one or more RSs transmitted by the one or more neighboring base stations, and means for transmitting, without receiving a measurement report associated with the physical layer measurements at the UE related to the one or more reference signals transmitted by the one or more neighboring base stations, a handover command to the UE to establish a second connection with a target base station of the one or more neighboring base stations.

A non-transitory computer-readable medium storing code for wireless communication at a source base station is described. The code may include instructions executable by a processor to identify one or more neighboring base stations as candidates for a handover of a UE from the source base station, determine one or more sets of RS resources for transmission of one or more RSs by the one or more neighboring base stations, transmit, to the UE using a first connection that is established between the source base station and the UE, an indication to measure the one or more sets of RS resources that are available for physical layer measurements at the UE of the one or more RSs transmitted by the one or more neighboring base stations, and transmit, without receiving a measurement report associated with the physical layer measurements at the UE related to the one or more reference signals transmitted by the one or more neighboring base stations, a handover command to the UE to establish a second connection with a target base station of the one or more neighboring base stations.

In some examples of the method, apparatuses, and non-transitory computer-readable medium described herein, the determining one or more sets of reference signal resources for transmission of one or more reference signals by the one or more neighboring base stations may further include operations, features, means, or instructions for transmitting, responsive to the identifying the one or more neighboring base stations, a handover message to the one or more neighboring base stations to prepare for a potential handover of the UE and receiving, from the one or more neighboring base stations responsive to the handover message, a response message that indicates the one or more sets of RS resources for transmission of the one or more RSs by the one or more neighboring base stations.

In some examples of the method, apparatuses, and non-transitory computer-readable medium described herein, the one or more RSs include a TRS transmitted by the one or more neighboring base stations, and the physical layer measurements include at least part of time offset measurements, frequency offset measurements, or combinations thereof, that may be based on the TRS.

In some examples of the method, apparatuses, and non-transitory computer-readable medium described herein, the TRS may be a periodic or semi-persistent TRS transmitted by the one or more neighboring base stations using the one or more sets of RS resources indicated to the UE by the source base station.

In some examples of the method, apparatuses, and non-transitory computer-readable medium described herein, the TRS may be an aperiodic TRS that may be transmitted in a same downlink transmission that may be used to transmit the handover command to the UE.

In some examples of the method, apparatuses, and non-transitory computer-readable medium described herein, the one or more RSs include a CSI-RS transmitted by the one or more neighboring base stations in a selected beam, and the physical layer measurements include beam refinement measurements for one or more beamforming parameters associated with the selected beam that may be based on the CSI-RS.

In some examples of the method, apparatuses, and non-transitory computer-readable medium described herein, the selected beam may be identified based on a preferred SSB of each of the one or more neighboring base stations that may be reported by the UE to the source base station.

In some examples of the method, apparatuses, and non-transitory computer-readable medium described herein, the CSI-RS may be a periodic or semi-persistent CSI-RS transmitted by the one or more neighboring base stations using the one or more sets of RS resources indicated to the UE by the source base station.

In some examples of the method, apparatuses, and non-transitory computer-readable medium described herein, the CSI-RS may be an aperiodic CSI-RS that may be transmitted in a same downlink transmission that may be used to transmit the handover command to the UE.

In some examples of the method, apparatuses, and non-transitory computer-readable medium described herein, the CSI-RS includes a repetition parameter that may be set to ON to indicate that measurements of the CSI-RS may be to be unreported by the UE.

DETAILED DESCRIPTION

Figure 1:
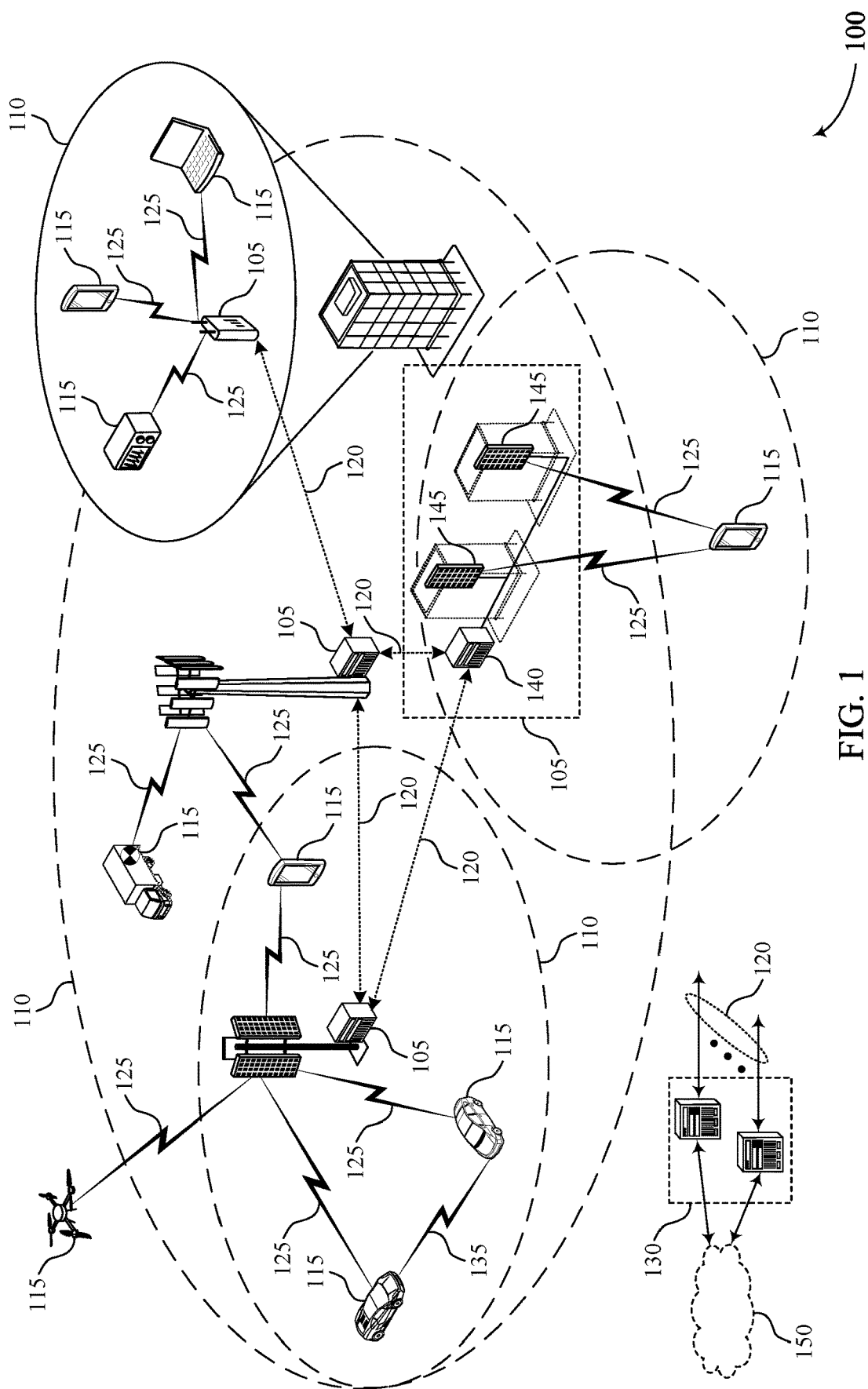
FIG. 1 illustrates an example of a wireless communications system that supports physical layer measurement without reporting for user equipment (UE) mobility in accordance with aspects of the present disclosure.

In some implementations, a user equipment (UE) and a serving or source base station may establish a connection, and over time the UE may experience degraded signal quality or signal power due to interference on a wireless channel or attenuation associated with mobility of the UE within a service area of the source base station. The variation in signal quality or signal power may prompt the source base station to perform a handover of the UE to a target base station. Prior to performing the handover, the source base station may indicate a configuration of resources of one or more other non-serving base stations (also referred to as neighbor or neighboring base stations) for the UE to measure reference signal (RS) transmissions from the one or more other non-serving base stations. Different configurations may be employed for different RS transmissions, such as a first configuration for channel state information RSs (CSI-RSs) and a second configuration for tracking RSs (TRSs). The configuration of resources may indicate one or more physical layer parameters for measurement by the UE and may include time and frequency resources for RS transmissions of each non-serving base station, which may be monitored by the UE. The UE may measure one or more physical layer (also referred to as Layer 1 (L1)) parameters, and store the measurements for use in the event that the UE receives a handover command to a target base station of the non-serving base stations, where the L1 measurements made by the UE are unreported prior to establishment of the connection with the target base station. The measured physical layer parameters may include, for example, one or more of timing error, frequency error, one or more time/frequency offset values, beam refinement measurements, or any combinations thereof, that are based on RS measurements from the neighbor base stations.

Such techniques allow for improved handover of the UE from the source base station to the target base station relative to existing handover techniques. In some existing handover techniques, L1 parameters may not be measured for non-serving base stations until a handover command is received. In such cases, upon receipt of a handover command, the UE may measure L1 parameters and apply such measurements (e.g., time offsets, frequency offsets, beamforming parameters, or any combinations thereof) after completing the measurements. Such techniques may result in a period of time in which the UE and base station do not perform data communications, resulting in communication inefficiencies and increased latency. Techniques discussed herein may provide lower latency for communications with the target base station by reducing or eliminating the period of time in which the UE and base station do not exchange data communications. In some cases, a UE may measure and report L1 parameters, however such reporting increases overhead and consumes additional power.

Particular implementations of the subject matter described in this disclosure may be implemented to realize one or more of the following potential advantages. For example, the indicated configurate of RS resources and related measurements for the non-serving base stations may be used by the UE for reducing delay associated with connecting to a target base station selected from the non-serving base stations as part of a handover procedure by reducing or eliminating the time for measuring L1 parameters after a handover command is received by the UE. In some implementations, the UE may eliminate RS measurements of the target base station after receiving a handover command and proceed directly to transmitting an uplink transmission, such as a handover complete indication or random access channel (RACH) message, to the target base station responsive to the handover command. Additionally, or alternatively, the UE may implement the identified RS measurements and parameter storage for non-serving base stations, which may reduce the latency of handover and suspension of data transmission, and therefore increase signaling reliability, throughput, and user experience while reducing power consumption. The described advantages may be beneficial for wireless communications systems such as New Radio (NR) or 5th Generation (5G) system and communications associated with low latency or quality of service (QoS) standards, such as mission critical applications.

Aspects of the disclosure are initially described in the context of wireless communications systems. Examples of communications between base stations and a UE are then described. Aspects of the disclosure are further illustrated by and described with reference to apparatus diagrams, system diagrams, and flowcharts that relate to physical layer measurement without reporting for user equipment mobility.

FIG. 1 illustrates an example of a wireless communications system 100 that supports physical layer measurement without reporting for UE mobility in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol), and the UEs 115 communicating via D2D communications may be referred to as a group of UEs. One or more UEs 115 in the group utilizing D2D communications may be within the geographic coverage area 110 of a base station 105. Other UEs 115 in such a group may be outside the geographic coverage area 110 of the base station 105 or be otherwise unable to receive transmissions from the base station 105. In some examples, the group of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The network operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, RSs, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a RS (e.g., a cell-specific RS (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, RSs, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some cases, a UE 115 may measure physical layer parameters (e.g., L1 parameters) of one or more RSs transmitted by one or more non-serving or neighbor base stations 105. The UE 115 may store the measured physical layer parameters and, in the event that a handover command is received from a source base station 105 to establish a connection with a target base station 105 selected from the one or more neighbor base stations 105, use the measured physical layer parameters for an uplink communication with the target base station 105, where the measured physical layer parameters are unreported by the UE 115 prior to establishing the connection with the target base station 105. In some cases, the source base station 105 may provide an indication of time and frequency resources that the UE 115 is to monitor for RSs of the neighbor base stations 105. In some cases, the RSs include one or more of a TRS or a CSI-RS.

Figure 2:
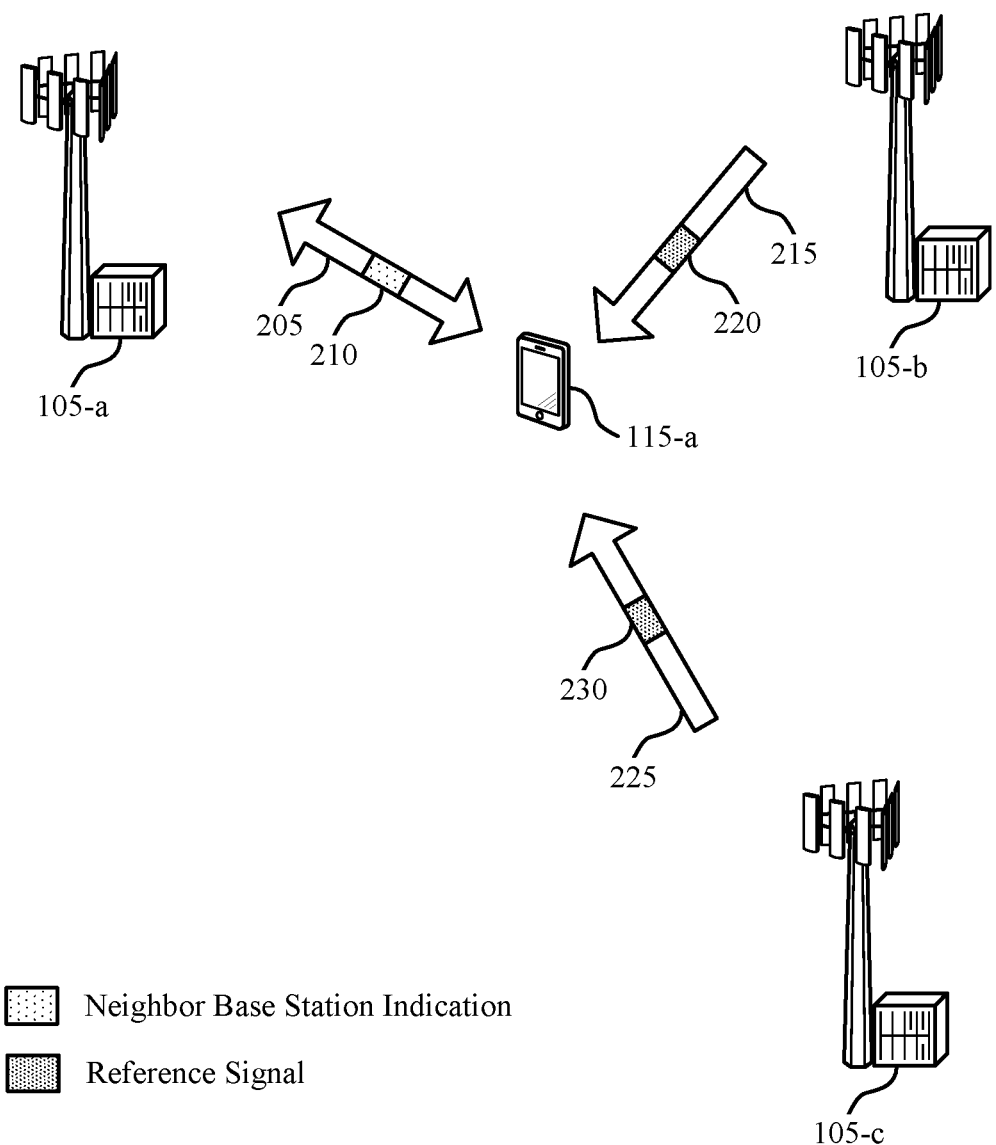
FIG. 2 illustrates an example of a wireless communications system that supports physical layer measurement without reporting for UE mobility in accordance with aspects of the present disclosure.

FIG. 2 illustrates an example of a wireless communications system 200 that supports physical layer measurement without reporting for UE mobility in accordance with aspects of the present disclosure. In some examples, wireless communications system 200 may implement aspects of wireless communications system 100. In some examples, the wireless communications system 200 may include a UE 115-a and a number of base stations 105, including a source base station 105-a, and neighboring base stations 105-b and 105-c, which may be examples of UEs 115 and base stations 105 described with reference to FIG. 1.

In this example, the UE 115-a and the source base station 105-a may establish a connection 205 in which uplink and downlink communications may be exchanged. In some cases, the source base station 105-a may identify the neighbor base stations 105-b and 105-c, which may be non-serving base stations or cells, as candidates for a potential handover of the UE 115-a. In such cases, the source base station 105-a may coordinate with the neighbor base stations 105-b and 105-c to identify RS resources that the neighbor base stations 105-b and 105-c may use to transmit one or more RSs that may be measured at the UE 115-a. The source base station 105-a may transmit a neighbor base station indication 210 to the UE 115-a that indicates a configuration of resources of the neighbor base stations 105-b and 105-c for the UE 115-a, where the configuration of resources may indicate the RS resources (e.g., time resources and frequency resources of one or more of a TRS or a CSI-RS). In some examples, the neighbor base station indication 210 may indicate a configuration for measuring the physical layer parameters of one or more neighbor base stations 105-b and 105-c. Different configurations may be indicated, which may be associated with different RSs used for measuring. For example, a first configuration may be indicated for being used by the UE 115-a to measure CSI-RSs or a second configuration may be indicated for being used by the UE 115-b to measure TRSs.

The UE 115-a may monitor the indicated RS resources for RSs 220 and 230 that are transmitted by the neighbor base stations 105-b and 105-c. In this example, neighbor base station 105-b may transmit RS 220 with downlink transmissions 215, and neighbor base station 105-c may transmit RS 230 with downlink transmissions 225. The UE 115-a may perform one or more physical layer measurements of the RSs 220 and 230, such as, for example, L1 measurements for timing error, frequency error, one or more time/frequency offset values, beamforming parameters for receive beam refinement, and the like. The UE 115-a may store the physical layer measurements for use in the event that the UE 115-a determines that a handover to one of the neighbor base stations 105-b and 105-c is to be performed. For example, the UE 115-a may store L1 measurements relating to timing error(s) or time offset(s) associated with the RSs 220 and 230, and may adjust transmission timing for an uplink transmission based on the stored timing error(s) or time offset(s) measurements. In some aspects, the UE 115-a may store L1 measurements relating to frequency error(s) or frequency offset(s) associated with the RSs 220 and 230, and may adjust a frequency, carrier, or frequency range for the uplink transmission based on the stored frequency error(s) or frequency offset(s). Additionally, or alternatively, the UE 115-a may store L1 measurements relating to beamforming parameters associated with the RSs 220 and 230, and may adjust a transmit beam, receive beam, or transmit-receive beam pair for communications (e.g., an uplink transmission) with a neighbor base station 105-b or 105-c based on the stored beamforming parameters.

Figure 3:
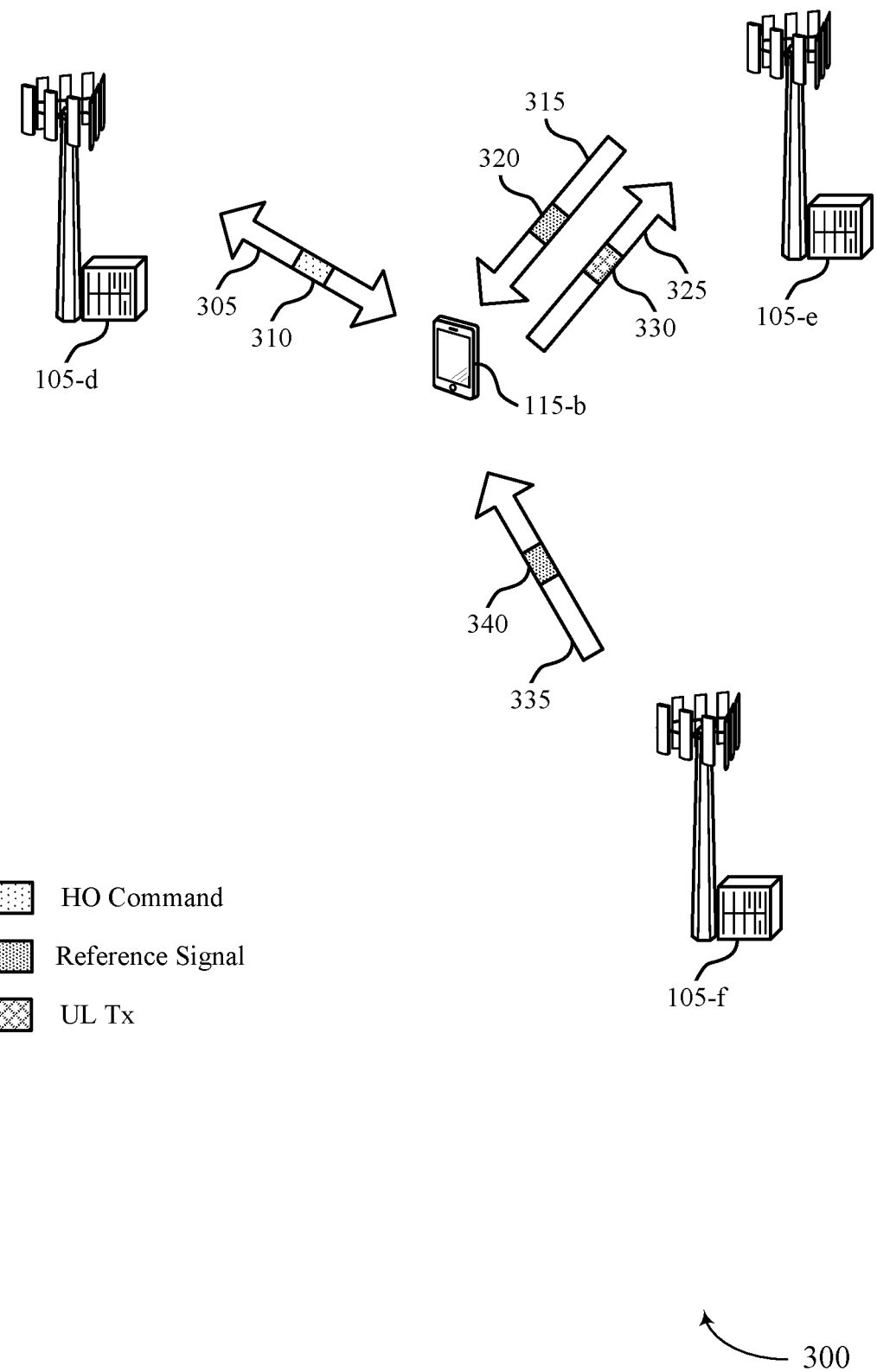
FIG. 3 illustrates an example of a handover procedure in a wireless communications system that supports physical layer measurement without reporting for UE mobility in accordance with aspects of the present disclosure.

For example, UE 115-a may receive a handover command from the source base station 105-a, which may be an L1 or Layer 2 (L2) handover command, where an L1 or L2 handover command may be used to indicate a cell or physical cell identity (PCI) switch handover procedure where UE 115-a switches from one or more serving cells or PCIs to one or more different serving cells or PCIs for communications. The handover may involve a corresponding beam switch where an L1 or L2 signaling may be used to indicate a beam switch in which UE 115-a switches from one or more transmit or receive beams (e.g., beam pair) to one or more different transmit or receive beams (e.g., beam pair) for communications. In other cases, some other predetermined criteria (e.g., measured signal strength of neighboring base stations 105-b or 105-c exceeding a threshold, mobility information such as speed or direction in which the UE 115-a may be travelling, among other criteria) may be satisfied for the UE 115-a to determine to perform a handover The UE 115-a, in accordance with various aspects provided herein, may not report the measured physical layer parameters to the source base station 105-a, and may instead store the physical layer measurements and update in the event that further measurements are performed or requested to be performed. When performing the handover to a target base station (e.g., base station 105-b) of the non-serving neighbor base stations 105-b and 105-c, the physical layer measurements made by the UE 115-a may be used to enhance the efficiency of the handover procedure and communicate data transmissions with the target base station 105-b with relatively low latency. FIG. 3 illustrates an example of a handover using stored physical layer parameters.

FIG. 3 illustrates an example of a handover in a wireless communications system 300 that supports physical layer measurement without reporting for UE mobility in accordance with aspects of the present disclosure. In some examples, handover in a wireless communications system 300 may implement aspects of wireless communications systems 100 or 200. In some examples, the wireless communications system 300 may include a UE 115-b and a number of base stations 105, including a source base station 105-d, and neighboring base stations 105-e and 105-f, which may be examples of UEs 115 and base stations 105 described with reference to FIG. 1.

In this example, the UE 115-b and the source base station 105-d may establish a connection 305 in which uplink and downlink communications may be exchanged. As discussed with reference to FIG. 2, the UE 115-b may measure physical layer parameters of neighbor base station 105-e based on RS 320 transmitted with downlink transmissions 315, and may measure physical layer parameters of neighbor base station 105-f based on RS 340 transmitted with downlink transmissions 325. In this example, the source base station 105-d may transmit a handover command 310 to the UE 115-b that indicates target base station 105-e. Based on the received handover command 310, the UE 115-b may retrieve the physical layer measurements that were stored for the target base station 105-e and may transmit an uplink transmission 330 via connection 325 with the target base station 105-e. In some cases, the UE 115-b may transmit a RACH message to the target base station 105-e, receive a random access response that grants uplink resources, and transmit the uplink transmission 330 using the granted uplink resources and one or more parameters that are based on the physical layer measurements that were previously stored for the target base station 105-e.

Such techniques allow for improved handover of the UE 115-b from the source base station 105-d to the target base station 105-e relative to existing handover techniques. For example, the stored physical layer measurements may allow the UE 115-b to complete the handover procedure in a relatively short period of time compared to cases where physical layer measurements and beam refinement are performed subsequent to receipt of the handover command 310. Further, by not reporting the measured physical layer parameters, resource overhead is reduced and the UE 115-b saves power relative to a case where physical layer parameters would be reported. In some cases, the UE 115-*b* may, subsequent to the handover command 310, transmit a measurement report to the target base station 105-*e* that may include one or more of the measured physical layer parameters.

As discussed herein, the UE 115-*b* may perform L1 measurements without reporting the measurements for one or more non-serving neighbor cells or for one or more non-serving PCIs. In some cases, the L1 measurements are made using a TRS that is transmitted from a non-serving neighbor cell/PCI. In some cases, the TRS may be a periodic or semi-persistent (P/SP) TRS transmitted from a non-serving neighbor cell/PCI that the UE 115-*b* may use to update a time and/or frequency offset. Thus, with such measurements stored at the UE 115-*b*, an advantage is that there is no need to update time/frequency offset for the target base station 105-*e* once it is selected to serve the UE 115-*b*. In other cases, the TRS may be an aperiodic TRS. In such cases, the aperiodic TRS may be transmitted by the target base station 105-*e* in the same downlink control information (DCI) or medium access control (MAC) control element (MAC-CE) transmission that is used to transmit the handover command 310 that selects the target base station 105-*e* to serve the UE 115-*b*. The UE 115-*b* in such a case may receive the DCI or MAC-CE, identify the resource that contains the TRS, and perform the TRS measurement.

Additionally or alternatively, the RSs measured at the UE 115-*b* may be CSI-RSs. In some cases, the CSI-RS transmissions may be for beam management, and may indicate a parameter for "repetition" that may be set to ON (i.e., indicating that the CSI-RS is a repetition signal that is not to be reported). In some cases, the neighbor base stations 105-*e* and 105-*f* may transmit P/SP CSI-RS with repetition ON using a transmission beam that is quasi co-located (QCL) with a synchronization signal block (SSB) of the associated neighbor base station 105-*e* or 105-*f* having a highest signal strength or quality. The UE 115-*b* may then measure the CSI-RS and refine a receive beam in accordance with a beam refinement procedure (e.g., P2/P3 beam refinement procedure in NR) based on the repeated CSI-RS resources. Thus, the UE 115-*b* may not need to refine the receive beam associated with the target base station 105-*e* after receiving the handover command 310. In other cases, the target base station 105-*e* may transmit an aperiodic CSI-RS with repetition ON in a same DCI or MAC-CE that indicates the target base station 105-*e* is selected for handover. The UE 115-*b* in such a case may receive the DCI or MAC-CE, identify the resource that contains the CSI-RS, and perform the beam refinement measurements.

Thus, in some implementations, the UE 115-*b* may reduce or eliminate RS measurements of the target base station 105-*e* after receiving a handover command 310 and proceed directly to transmitting an uplink transmission 330, such as a handover complete indication or RACH message, to the target base station 105-*e* responsive to the handover command 310. Such techniques may reduce the latency of handover and suspension of data transmission, and therefore increase signaling reliability, throughput, and user experience while reducing power consumption. The described advantages may be particularly beneficial for systems and communication requiring low latency QoS or corresponding to mission critical applications.

Figure 4:
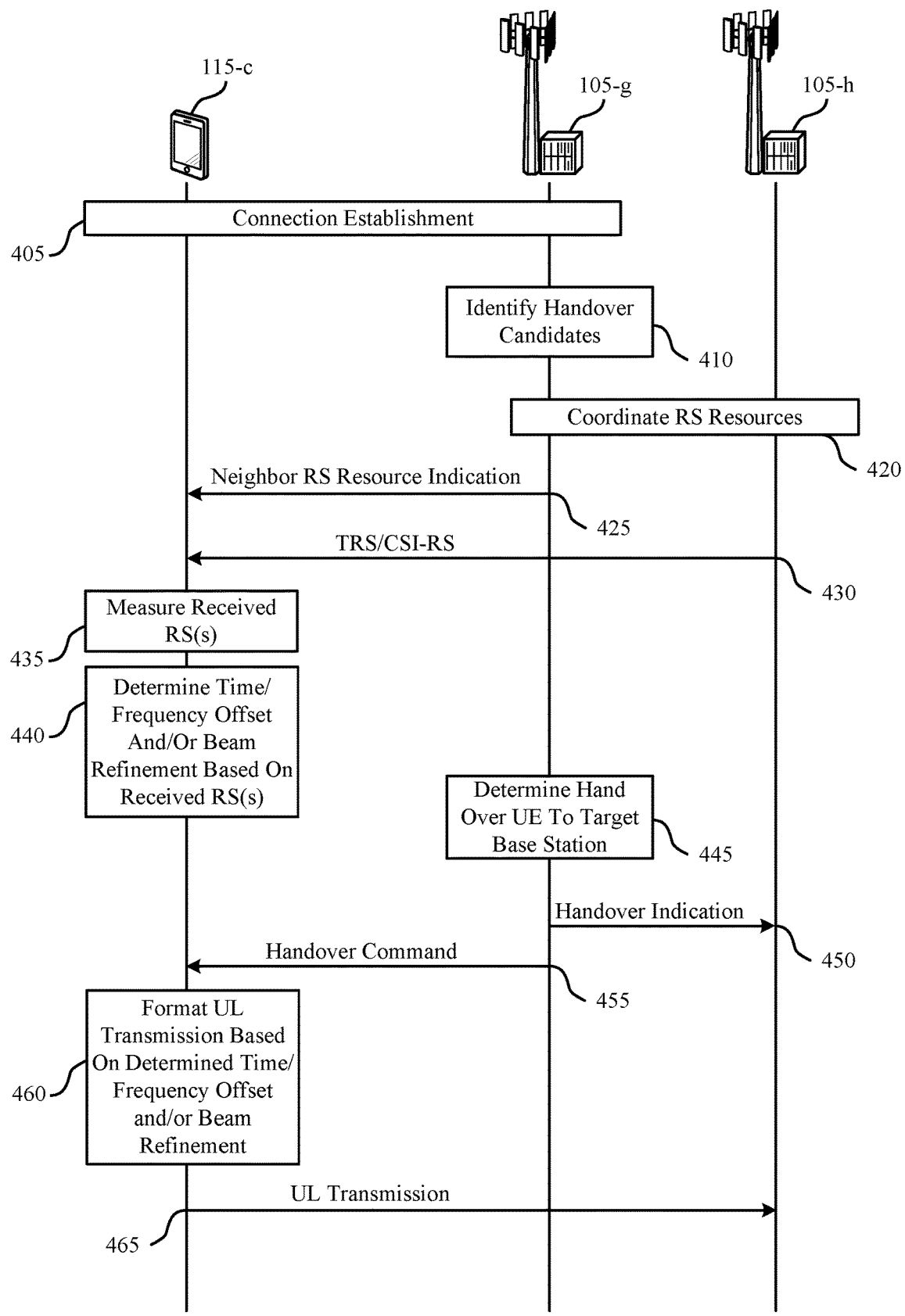
FIG. 4 illustrates an example of a process flow that supports physical layer measurement without reporting for UE mobility in accordance with aspects of the present disclosure.

FIG. 4 illustrates an example of a process flow 400 that supports physical layer measurement without reporting for UE mobility in accordance with aspects of the present disclosure. In some examples, process flow 400 may implement aspects of wireless communications systems 100, 200, or 300. For example, the process flow 400 may be based on a configuration by a base station 105 to measure neighbor base station RSs, and implemented for enhanced handovers which may provide reduced latency and power consumption, and may promote higher reliability and throughput, among other benefits.

The process flow 400 may include a source base station 105-*g*, a target base station 105-*h*, and a UE 115-*c*, which may be examples of base stations 105 and UEs 115 as described with reference to FIGS. 1 through 3. In the following description of the process flow 400, the communications between the base stations 105 and the UE 115-*c* may be transmitted in a different order than the example order shown, or the operations performed by the base stations 105 and the UE 115-*c* may be performed in different orders or at different times. Some operations may also be omitted from the process flow 400, and other operations may be added to the process flow 400. Further, while this example illustrates the base stations 105 transmitting and the UE 115-*c* receiving RSs (e.g., TRS or CSI-RS), techniques such as discussed herein may be used in cases where other devices may transmit or receive RSs in accordance with techniques as discussed herein.

At 405, the UE 115-*c* and source base station 105-*g* may establish a connection in accordance with radio resource control connection establishment techniques. In some cases, the connection between the UE 115-*c* and the source base station 105-*g* may use beamformed communications in which transmit beams and receive beams may be identified and refined in accordance with established beamforming techniques.

As discussed herein, UE 115-*c* mobility within a coverage area of the source base station 105-*g* may trigger a handover of the UE to target base station 105-*h*. In preparation for a potential handover of the UE 115-*c*, the source base station 105-*g*, at 410, may identify one or more handover candidate base stations or PCIs. Such candidate base stations may be identified based on a neighbor measurement report that does not indicate L1 measurements provided by the UE 115-*c*, for example. In some cases, the source base station 105-*g* may identify the neighbor base stations based on a known list of candidate neighbor base stations. At 420, the source base station 105-*g* and neighbor base stations may coordinate RS resources. In some cases, the source base station 105-*g* may request an indication of TRS or CSI-RS resources that are used for RS transmissions of each of the identified neighbor base stations.

At 425, the source base station 105-*g* may transmit the neighbor RS resource indication to the UE 115-*c*. In some cases, the source base station 105-*h* may provide configuration information to the UE 115-*c* to monitor RSs of the neighbor base stations and store physical layer measurements without reporting the physical layer measurements to the source base station 105-*g* or any neighbor base stations.

At 430, the target base station 105-*h* may transmit a RS which may be received at the UE 115-*c*. In some cases, the RS may be a TRS, a CSI-RS, or both. It is noted that at the time that the RS is transmitted, the target base station 105-*h* may not yet have been selected as the handover target, and may simply be one of a number of neighbor base stations that are monitored by the UE 115-*c*. Upon receipt of a handover message that selects the target base station 105-*h*, this base station becomes the handover target base station for the handover procedure.

At 435, the UE 115-*c* may measure the received RS(s). In some cases, the UE 115-*c* may measure one or more physical layer parameters of the RSs. At 440, the UE 115-c may determine a time offset, frequency offset, beam refinement parameters, or any combinations thereof based on the measured physical layer parameters of the received RS(s). The UE 115-c may store such parameters (e.g., in a memory of the UE 115-c) and may not transmit a measurement report associated with the physical layer measurements of the non-serving base stations (or cells/PCIs).

At 445, the source base station 105-g may determine to handover the UE 115-c to the target base station 105-h. Such a handover determination may be made based on established techniques to trigger a handover, such as one or more measurement reports that indicate the link quality between the source base station 105-g and UE 115-c has degraded beyond a threshold, mobility of the UE 115-c, other traffic present at the source base station 105-g and target base station 105-h, one or more neighbor base station measurement reports that do not indicate L1 measurements received from the UE 115-c, various other handover triggers, or any combinations thereof. At 450, the source base station 105-g may transmit a handover indication to the target base station 105-h. The handover indication may provide context information for the UE 115-c and other information related to communications with the UE 115-c such that the target base station 105-h may seamlessly continue to support UE 115-c communications.

At 455, the source base station 105-g may transmit a handover command to the UE 115-c. The handover command may indicate that the target base station 105-h has been selected as the handover target. In some cases, the handover command may indicate one or more parameters or resources (e.g., RACH preambles) that are to be used to complete the handover with the target base station 105-h.

At 460, the UE 115-c may format an uplink transmission to the target base station 105-g. The uplink transmission may be formatted based on the measured physical layer parameters, such as based on the measured time offset, frequency offset, beam refinement parameters, or combinations thereof. At 465, the UE 115-c may transmit the uplink transmission to the target base station 105-f based on the measured physical layer parameters.

Figure 5:
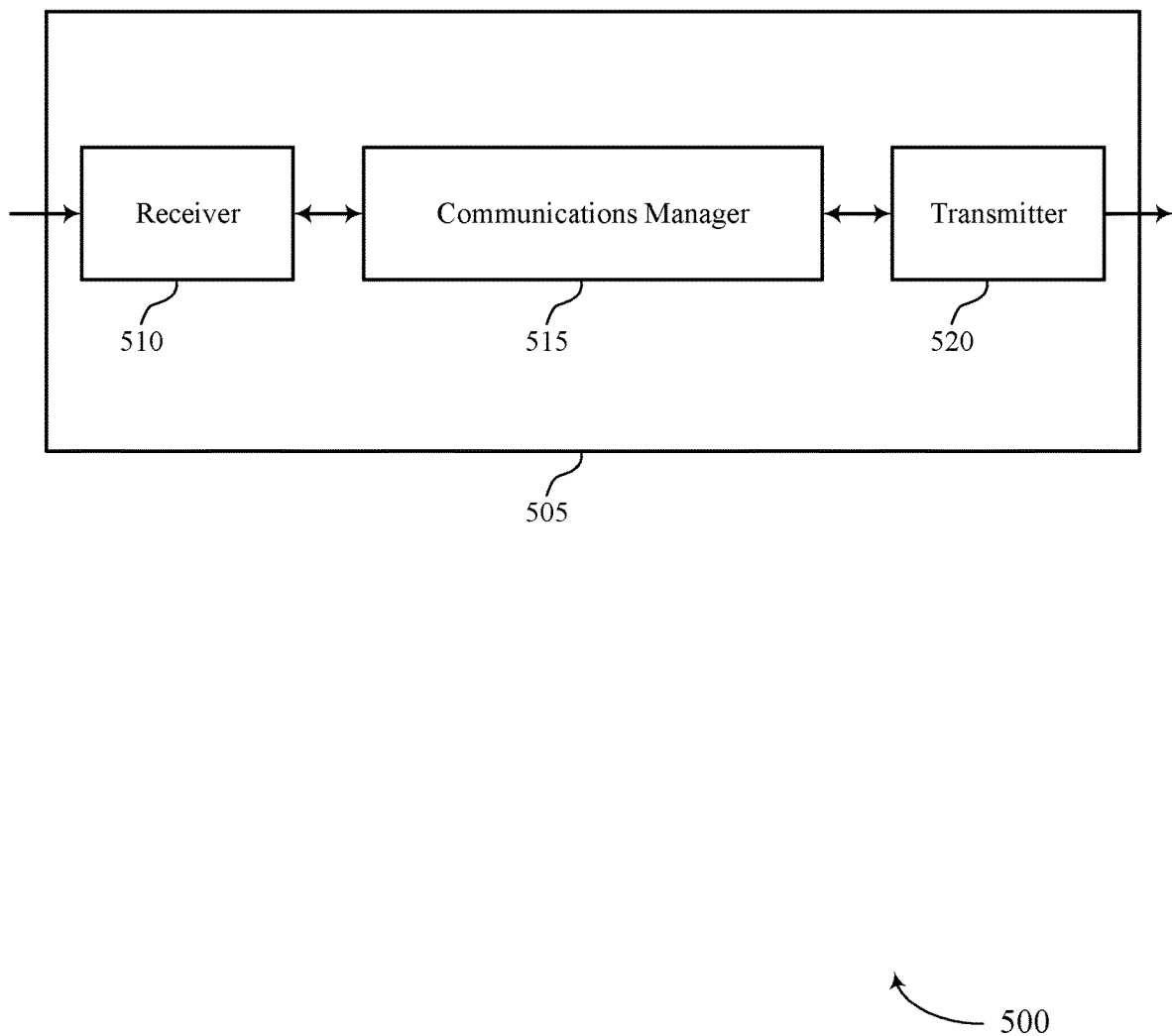
FIGS. 5 and 6 show block diagrams of devices that support physical layer measurement without reporting for UE mobility in accordance with aspects of the present disclosure.

FIG. 5 shows a block diagram 500 of a device 505 that supports physical layer measurement without reporting for UE mobility in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to physical layer measurement without reporting for UE mobility, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive, from a source base station using a first connection that is established between the source base station and the UE, an indication to measure one or more physical layer parameters of one or more RS transmissions of one or more neighboring base stations, measure the one or more physical layer parameters of the one or more RS transmissions of the one or more neighboring base stations to generate one or more physical layer measurements associated with the one or more neighboring base stations, and store the one or more physical layer measurements at the UE for use in establishing a second connection with a target base station selected from the one or more neighboring base stations, where the one or more physical layer measurements are unreported prior to establishing the second connection. The communications manager 515 may be an example of aspects of the communications manager 810 described herein.

The communications manager 515 may as described herein be implemented to realize one or more potential advantages. One implementation may allow the device 505 to reduce or eliminate RS measurements of the target base station after receiving a handover command and proceed directly to transmitting an uplink transmission, which may allow for improved handover procedures and establishment of connections with the target base station. Further, implementations may allow the device 505 to reduce the latency of handover and suspension of data transmission, and therefore increase signaling reliability, throughput, and user experience while reducing power consumption, among other advantages.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
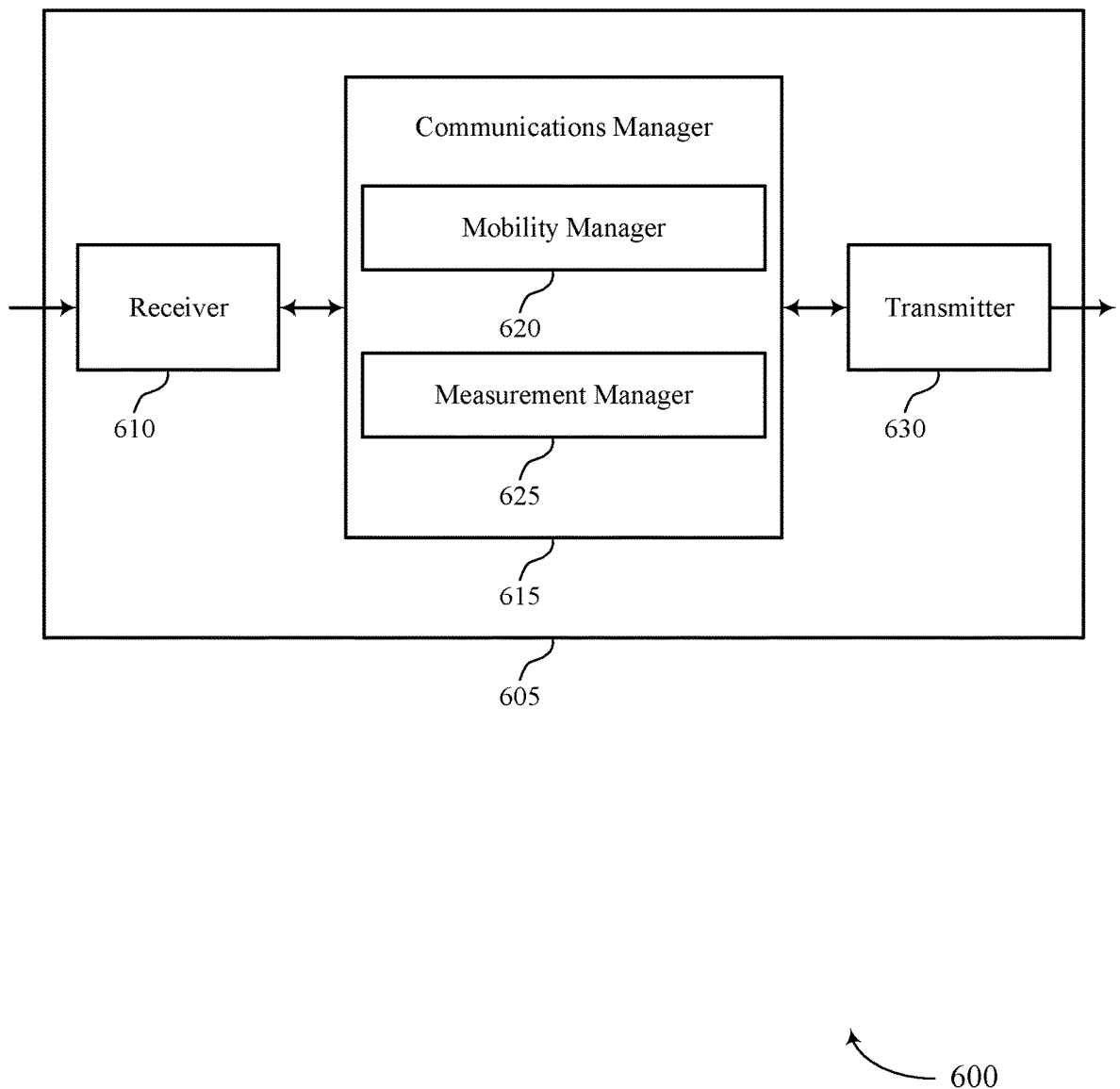

FIG. 6 shows a block diagram 600 of a device 605 that supports physical layer measurement without reporting for UE mobility in accordance with aspects of the present disclosure. The device 605 may be an example of aspects of a device 505, or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to physical layer measurement without reporting for UE mobility, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a mobility manager 620 and a measurement manager 625. The communications manager 615 may be an example of aspects of the communications manager 810 described herein.

The mobility manager 620 may receive, from a source base station using a first connection that is established between the source base station and the UE, an indication to measure one or more physical layer parameters of one or more RS transmissions of one or more neighboring base stations.

The measurement manager 625 may measure the one or more physical layer parameters of the one or more RS transmissions of the one or more neighboring base stations to generate one or more physical layer measurements associated with the one or more neighboring base stations and store the one or more physical layer measurements at the UE for use in establishing a second connection with a target base station selected from the one or more neighboring base stations, where the one or more physical layer measurements are unreported prior to establishing the second connection.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
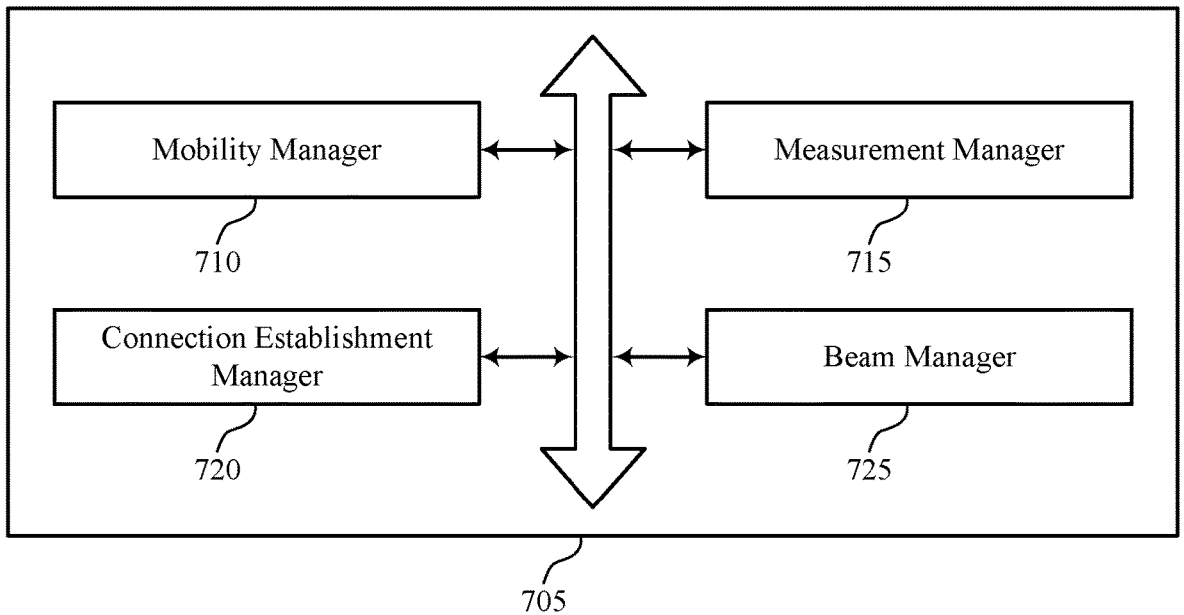
FIG. 7 shows a block diagram of a communications manager that supports physical layer measurement without reporting for UE mobility in accordance with aspects of the present disclosure.

FIG. 7 shows a block diagram 700 of a communications manager 705 that supports physical layer measurement without reporting for UE mobility in accordance with aspects of the present disclosure. The communications manager 705 may be an example of aspects of a communications manager 515, a communications manager 615, or a communications manager 810 described herein. The communications manager 705 may include a mobility manager 710, a measurement manager 715, a connection establishment manager 720, and a beam manager 725. Each of these modules may communicate, directly or indirectly, with one another (e.g., via one or more buses).

The mobility manager 710 may receive, from a source base station using a first connection that is established between the source base station and the UE, an indication to measure one or more physical layer parameters of one or more RS transmissions of one or more neighboring base stations. An advantage is that the source base station may indicate physical layers to be measured by the UE prior to handover. In some cases, the one or more RS transmissions of the one or more neighboring base stations are transmitted using time and frequency resources that are indicated by the source base station. An advantage is that the UE is indicated as to which resources are used for RS transmissions by the neighboring base stations, and may efficiently monitor such resources for performing measurements.

In some cases, the one or more RSs may include a TRS, a CSI-RS, or both. In some cases, the one or more RSs include TRS transmitted by the one or more neighboring base stations, and the one or more physical layer measurements include at least part of time offset measurements, frequency offset measurements, or combinations thereof, that are based on the TRS. An advantage is that the time and frequency measurements may be used for subsequent communications between the UE and at least one of the one or more neighboring base stations, as opposed to determining or updating such measurements after handover to the at least one of the one or more neighboring base stations. In some cases, the TRS is a periodic or semi-persistent TRS transmitted by the one or more neighboring base stations using time and frequency resources indicated to the UE by the source base station. An advantage is that the UE is indicated as to which resources are used for TRS transmissions by the neighboring base stations, and may therefore monitor such resources for performing measurements. In some cases, the TRS is an aperiodic TRS that is transmitted in a same downlink transmission that is used to indicate to the UE to select the target base station for a handover procedure.

In some cases, the one or more RSs include a CSI-RS transmitted by the one or more neighboring base stations in a selected beam, and the one or more physical layer measurements include at least part of beam refinement measurements for one or more beamforming parameters associated with the selected beam that are based on the CSI-RS. An advantage is that the UE is may use the beam refinement measurements for determining or modifying a transmit or receive beam to use for subsequent communications with at least one of the one or more neighboring base stations as opposed to determining transmit or receive beams after handover to the at least one of the one or more neighboring base stations. In some cases, the CSI-RS is a periodic or semi-persistent CSI-RS transmitted by the one or more neighboring base stations using time and frequency resources indicated to the UE by the source base station. An advantage is that the UE is indicated as to which resources are used for CSI-RS transmissions by the neighboring base stations, and may efficiently monitor such resources for performing measurements. In some cases, an aperiodic CSI-RS may be transmitted in a same downlink transmission that is used to indicate to the UE to select the target base station for a handover procedure. In some cases, the CSI-RS includes a repetition parameter that is set to ON to indicate that measurements of the CSI-RS is to be unreported by the UE. An advantage is that the UE is indicated as to which measurements are to be unreported.

The measurement manager 715 may measure the one or more physical layer parameters of the one or more RS transmissions of the one or more neighboring base stations to generate one or more physical layer measurements associated with the one or more neighboring base stations. In some examples, the measurement manager 715 may store the one or more physical layer measurements at the UE for use in establishing a second connection with a target base station selected from the one or more neighboring base stations, where the one or more physical layer measurements are unreported prior to establishing the second connection. An advantage is that the UE the physical layer measurements are not reported, and resource overhead is reduced and power at the UE is saved.

The connection establishment manager 720 may receive a handover command from the source base station to initiate a handover procedure to establish the second connection with the target base station. In some examples, the connection establishment manager 720 may transmit, responsive to the handover command, one or more uplink communications to the target base station based on the one or more physical layer measurements. An advantage is that the UE is may use the obtain physical layer measurements for communicating with the target base station after handover as opposed to obtaining or updating such measurements after handover and before transmitting uplink communications to the target base station.

The beam manager 725 may identify preferred beams (e.g., based on preferred SSBs transmitted by neighboring base stations). In some cases, the selected beam for receipt of CSI-RS from a neighboring base station is QCL with a preferred SSB associated with the neighboring base station that is reported by the UE to the source base station. An advantage is that the UE is may use the selected beam based on unreported measurements to communicate with the neighboring base station as opposed to determining or update beam parameters to select a beam for communications with the neighboring base station after the neighboring base station is selected to serve the UE.

Figure 8:
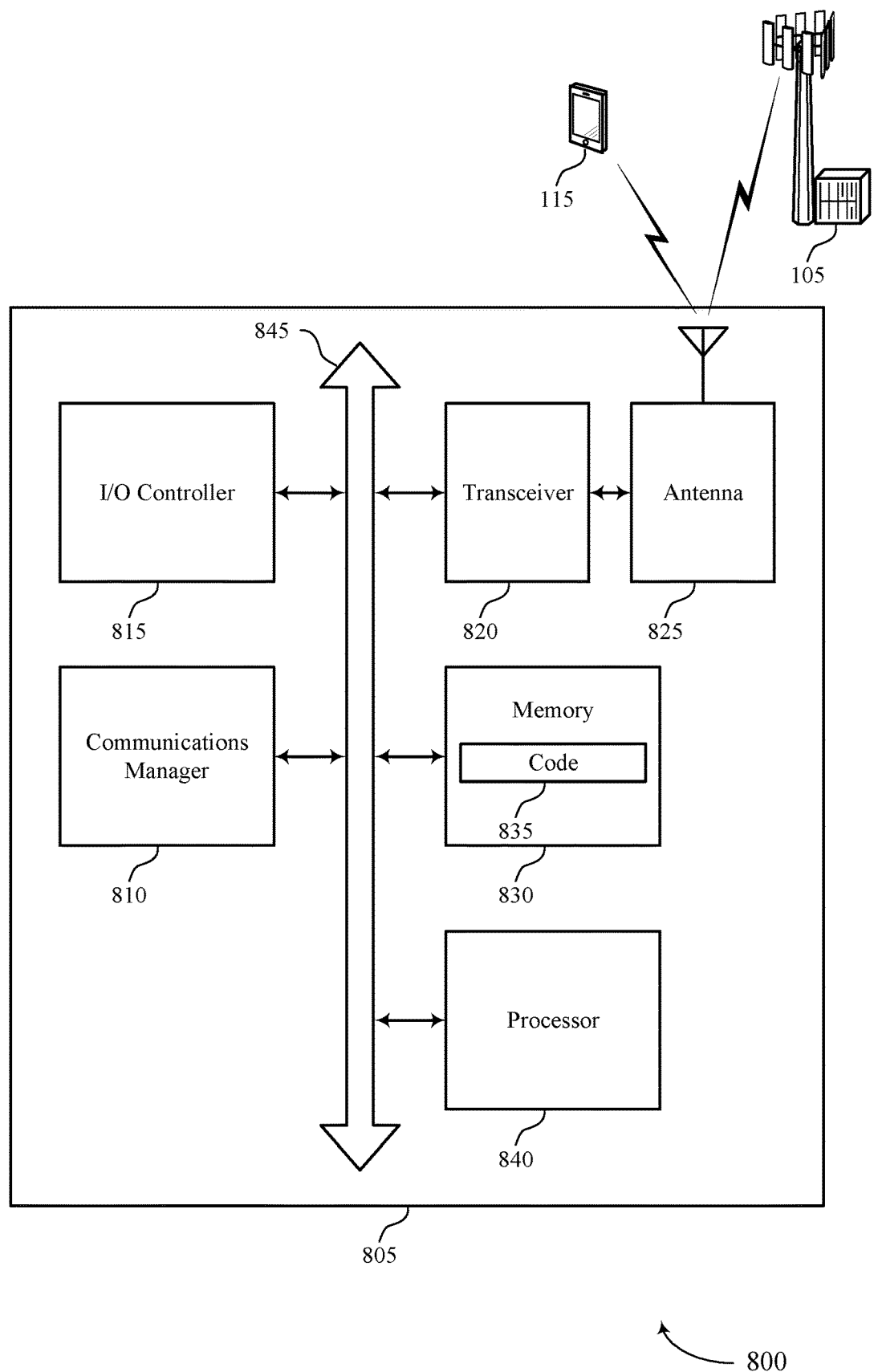
FIG. 8 shows a diagram of a system including a device that supports physical layer measurement without reporting for UE mobility in accordance with aspects of the present disclosure.

FIG. 8 shows a diagram of a system 800 including a device 805 that supports physical layer measurement without reporting for UE mobility in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive, from a source base station using a first connection that is established between the source base station and the UE, an indication to measure one or more physical layer parameters of one or more RS transmissions of one or more neighboring base stations, measure the one or more physical layer parameters of the one or more RS transmissions of the one or more neighboring base stations to generate one or more physical layer measurements associated with the one or more neighboring base stations, and store the one or more physical layer measurements at the UE for use in establishing a second connection with a target base station selected from the one or more neighboring base stations, where the one or more physical layer measurements are unreported prior to establishing the second connection.

The communications manager 810 may as described herein be implemented to realize one or more potential advantages. One implementation may allow the device 805 to reduce or eliminate RS measurements of the target base station after receiving a handover command and proceed directly to transmitting an uplink transmission, which may allow for improved handover procedures and establishment of connections with the target base station. Further, implementations may allow the device 805 to reduce the latency of handover and suspension of data transmission, and therefore increase signaling reliability, throughput, and user experience while reducing power consumption, among other advantages.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting physical layer measurement without reporting for UE mobility).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
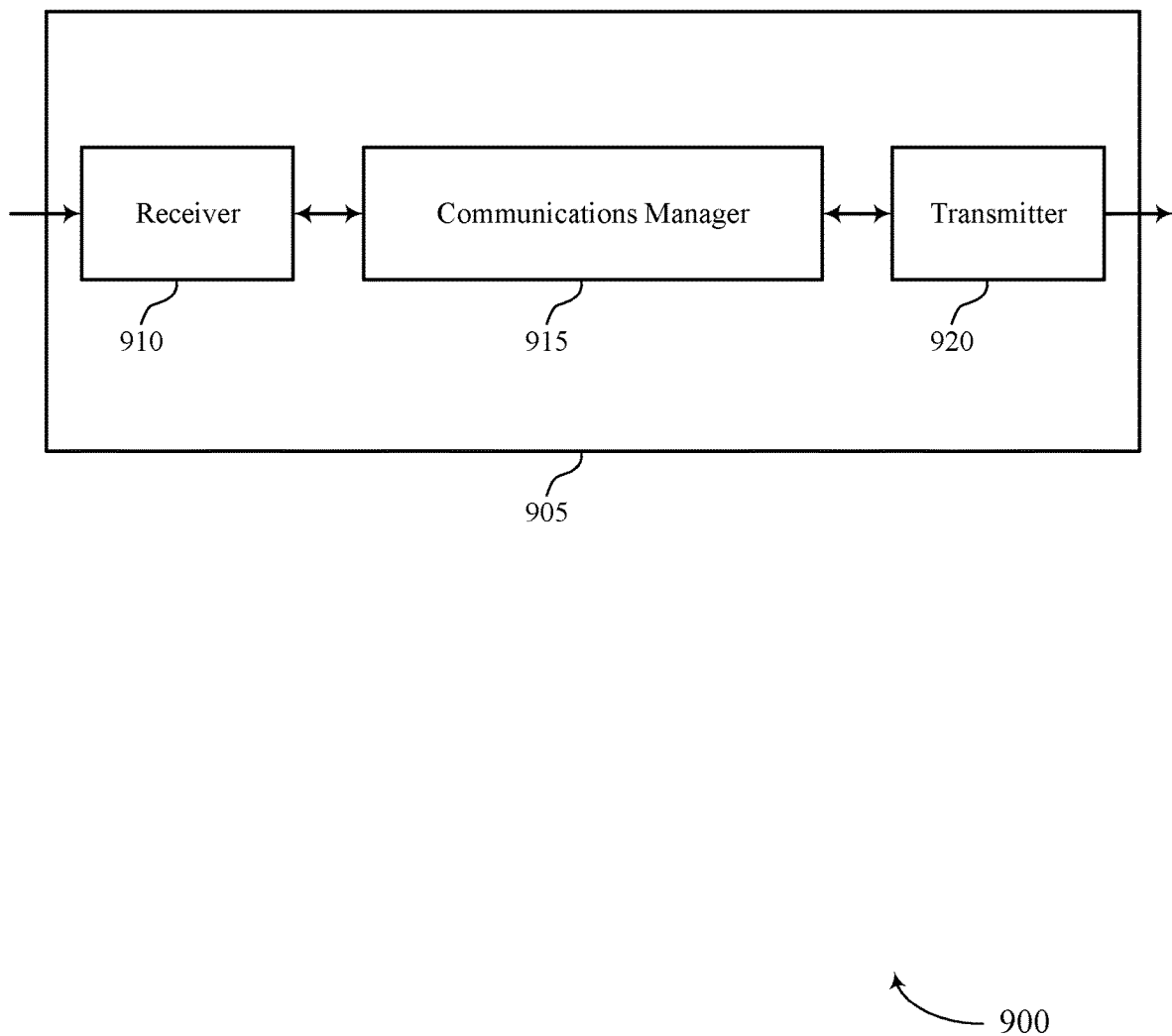
FIGS. 9 and 10 show block diagrams of devices that support physical layer measurement without reporting for UE mobility in accordance with aspects of the present disclosure.

FIG. 9 shows a block diagram 900 of a device 905 that supports physical layer measurement without reporting for UE mobility in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to physical layer measurement without reporting for UE mobility, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may identify one or more neighboring base stations as candidates for a handover of a UE from the source base station, determine one or more sets of RS resources for transmission of one or more RSs by the one or more neighboring base stations, transmit, to the UE using a first connection that is established between the source base station and the UE, an indication to measure the one or more sets of RS resources that are available for physical layer measurements at the UE of the one or more RSs transmitted by the one or more neighboring base stations, and transmit, without receiving a measurement report associated with the physical layer measurements at the UE related to the one or more reference signals transmitted by the one or more neighboring base stations, a handover command to the UE to establish a second connection with a target base station of the one or more neighboring base stations. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
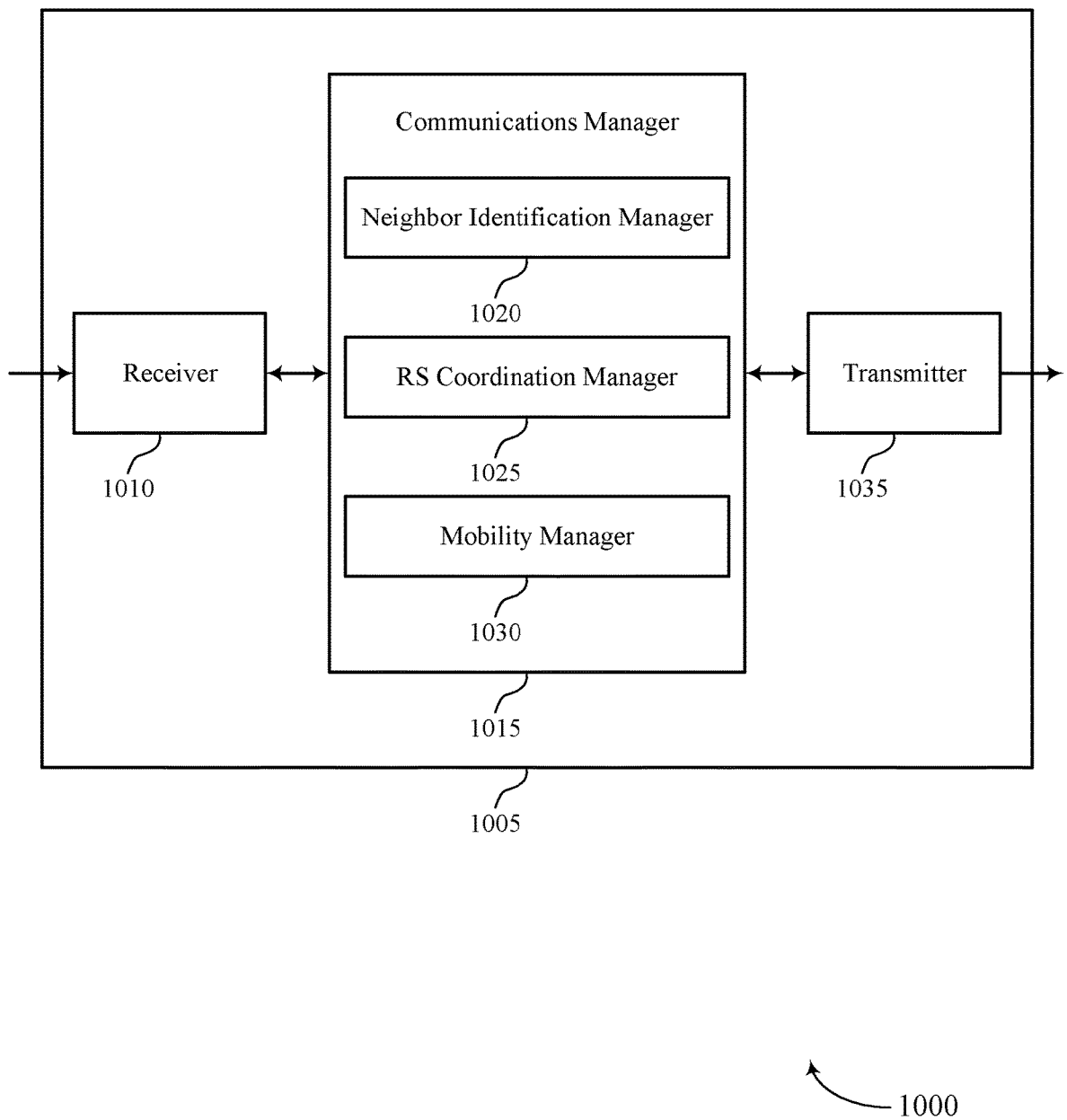

FIG. 10 shows a block diagram 1000 of a device 1005 that supports physical layer measurement without reporting for UE mobility in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to physical layer measurement without reporting for UE mobility, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a neighbor identification manager 1020, a RS coordination manager 1025, and a mobility manager 1030. The communications manager 1015 may be an example of aspects of the communications manager 1210 described herein.

The neighbor identification manager 1020 may identify one or more neighboring base stations as candidates for a handover of a UE from the source base station.

The RS coordination manager 1025 may determine one or more sets of RS resources for transmission of one or more RSs by the one or more neighboring base stations.

The mobility manager 1030 may transmit, to the UE using a first connection that is established between the source base station and the UE, an indication to measure the one or more sets of RS resources that are available for physical layer measurements at the UE of the one or more RSs transmitted by the one or more neighboring base stations and transmit, without receiving a measurement report associated with the physical layer measurements at the UE related to the one or more reference signals transmitted by the one or more neighboring base stations, a handover command to the UE to establish a second connection with a target base station of the one or more neighboring base stations.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
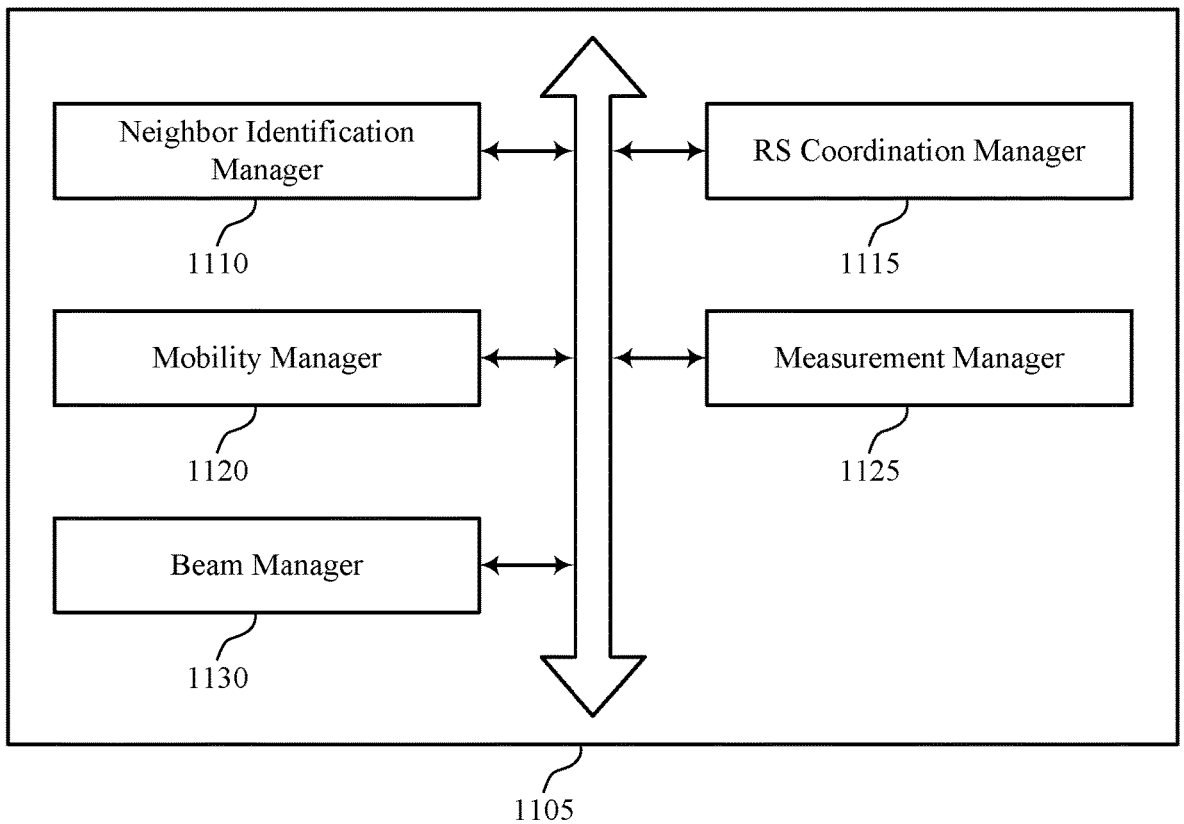
FIG. 11 shows a block diagram of a communications manager that supports physical layer measurement without reporting for UE mobility in accordance with aspects of the present disclosure.

FIG. 11 shows a block diagram 1100 of a communications manager 1105 that supports physical layer measurement without reporting for UE mobility in accordance with aspects of the present disclosure. The communications manager 1105 may be an example of aspects of a communications manager 915, a communications manager 1015, or a communications manager 1210 described herein. The communications manager 1105 may include a neighbor identification manager 1110, a RS coordination manager 1115, a mobility manager 1120, a measurement manager 1125, and a beam manager 1130. Each of these modules may communicate, directly or indirectly, with one another (e.g., via one or more buses).

The neighbor identification manager 1110 may identify one or more neighboring base stations as candidates for a handover of a UE from the source base station.

The RS coordination manager 1115 may determine one or more sets of RS resources for transmission of one or more RSs by the one or more neighboring base stations. In some examples, the RS coordination manager 1115 may transmit, responsive to the identifying the one or more neighboring base stations, a handover message to the one or more neighboring base stations to prepare for a potential handover of the UE. In some examples, the RS coordination manager 1115 may receive, from the one or more neighboring base stations responsive to the handover message, a response message that indicates the one or more sets of RS resources for transmission of one or more RSs by the one or more neighboring base stations.

The mobility manager 1120 may transmit, to the UE using a first connection that is established between the source base station and the UE, an indication to measure the one or more sets of RS resources that are available for physical layer measurements at the UE of the one or more RSs transmitted by the one or more neighboring base stations. In some examples, the mobility manager 1120 may transmit, without receiving a measurement report associated with the physical layer measurements at the UE related to the one or more reference signals transmitted by the one or more neighboring base stations, a handover command to the UE to establish a second connection with a target base station of the one or more neighboring base stations.

The measurement manager 1125 may determine a handover is to be triggered based on one or more measurement reports that do not indicate L1 measurements provided by the UE, and identify a target base station.

In some cases, the one or more RSs include a TRS transmitted by the one or more neighboring base stations, and the physical layer measurements include at least part of time offset measurements, frequency offset measurements, or combinations thereof, that are based on the TRS. In some cases, the TRS is a periodic or semi-persistent TRS transmitted by the one or more neighboring base stations using the one or more sets of RS resources indicated to the UE by the source base station. In some cases, the TRS is an aperiodic TRS that is transmitted in a same downlink transmission that is used to transmit the handover command to the UE.

In some cases, the one or more RSs include a CSI-RS transmitted by the one or more neighboring base stations in a selected beam, and the physical layer measurements include beam refinement measurements for one or more beamforming parameters associated with the selected beam that are based on the CSI-RS. In some cases, the CSI-RS is a periodic or semi-persistent CSI-RS transmitted by the one or more neighboring base stations using the one or more sets of RS resources indicated to the UE by the source base station. In some cases, the CSI-RS is an aperiodic CSI-RS that is transmitted in a same downlink transmission that is used to transmit the handover command to the UE. In some cases, the CSI-RS includes a repetition parameter that is set to ON to indicate that measurements of the CSI-RS is to be unreported by the UE.

The beam manager 1130 may determine beamforming parameters for beamformed communications. In some cases, a selected beam for the UE to measure CSI-RS of neighboring base stations is identified as a beam that is QCL with a preferred SSB of each of the one or more neighboring base stations that is reported by the UE to the source base station.

Figure 12:
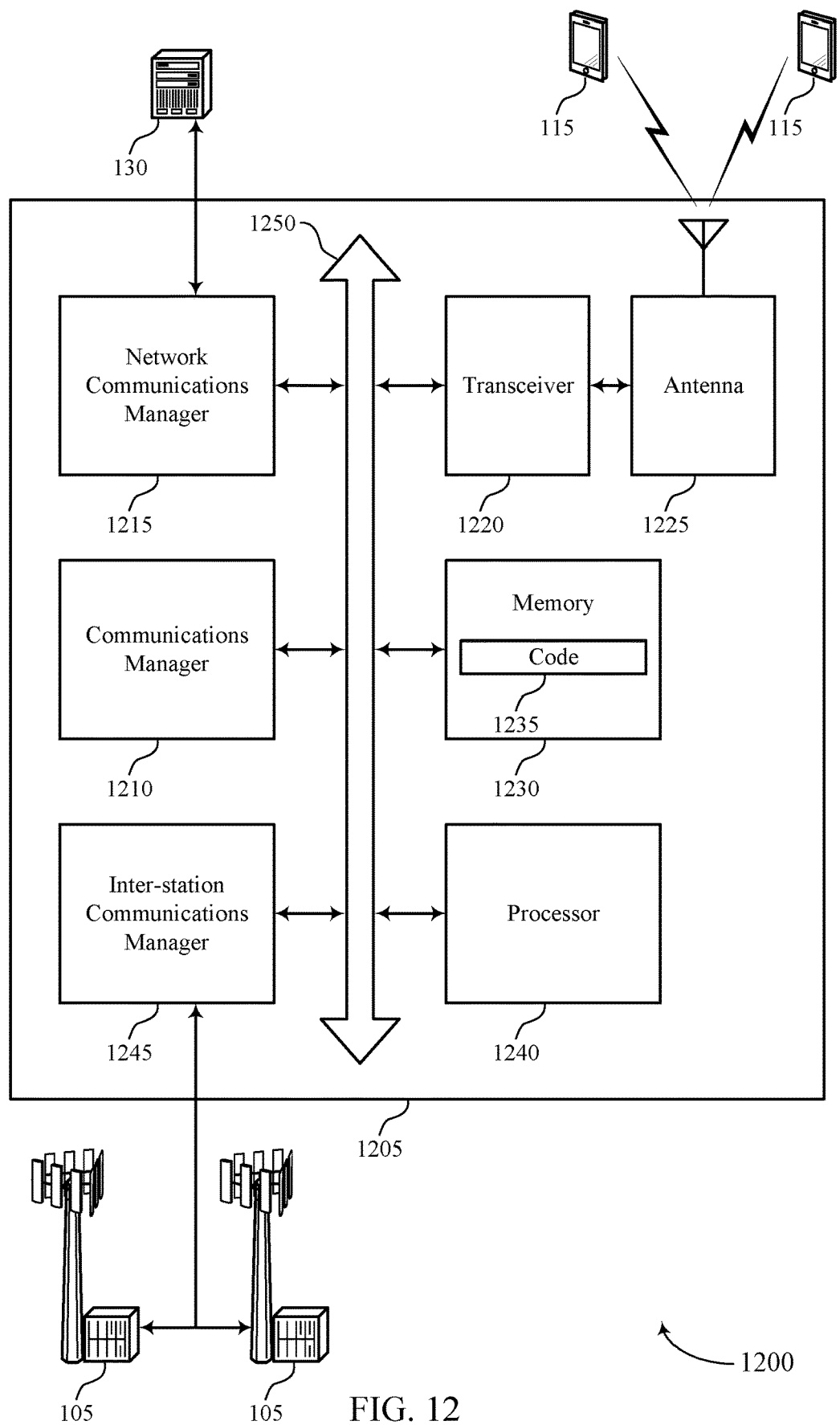
FIG. 12 shows a diagram of a system including a device that supports physical layer measurement without reporting for UE mobility in accordance with aspects of the present disclosure.

FIG. 12 shows a diagram of a system 1200 including a device 1205 that supports physical layer measurement without reporting for UE mobility in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may identify one or more neighboring base stations as candidates for a handover of a UE from the source base station, determine one or more sets of RS resources for transmission of one or more RSs by the one or more neighboring base stations, transmit, to the UE using a first connection that is established between the source base station and the UE, an indication to measure the one or more sets of RS resources that are available for physical layer measurements at the UE of the one or more RSs transmitted by the one or more neighboring base stations, and transmit, without receiving a measurement report associated with the physical layer measurements at the UE related to the one or more reference signals transmitted by the one or more neighboring base stations, a handover command to the UE to establish a second connection with a target base station of the one or more neighboring base stations.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting physical layer measurement without reporting for UE mobility).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
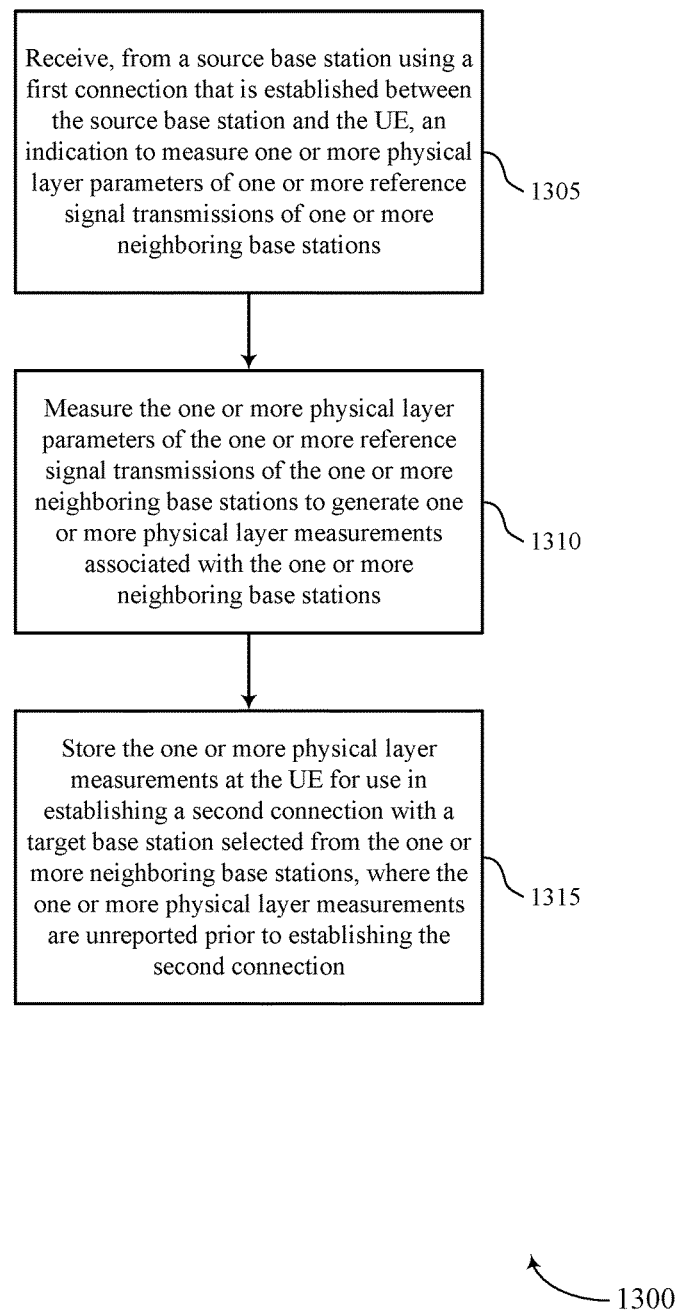
FIGS. 13 through 16 show flowcharts illustrating methods that support physical layer measurement without reporting for UE mobility in accordance with aspects of the present disclosure.

FIG. 13 shows a flowchart illustrating a method 1300 that supports physical layer measurement without reporting for UE mobility in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may receive, from a source base station using a first connection that is established between the source base station and the UE, an indication to measure one or more physical layer parameters of one or more RS transmissions of one or more neighboring base stations. The operations of 1305 may be performed according to the methods described herein. In some examples, aspects of the operations of 1305 may be performed by a mobility manager as described with reference to FIGS. 5 through 8.

At 1310, the UE may measure the one or more physical layer parameters of the one or more RS transmissions of the one or more neighboring base stations to generate one or more physical layer measurements associated with the one or more neighboring base stations. The operations of 1310 may be performed according to the methods described herein. In some examples, aspects of the operations of 1310 may be performed by a measurement manager as described with reference to FIGS. 5 through 8.

At 1315, the UE may store the one or more physical layer measurements at the UE for use in establishing a second connection with a target base station selected from the one or more neighboring base stations, where the one or more physical layer measurements are unreported prior to establishing the second connection. The operations of 1315 may be performed according to the methods described herein. In some examples, aspects of the operations of 1315 may be performed by a measurement manager as described with reference to FIGS. 5 through 8.

Figure 14:
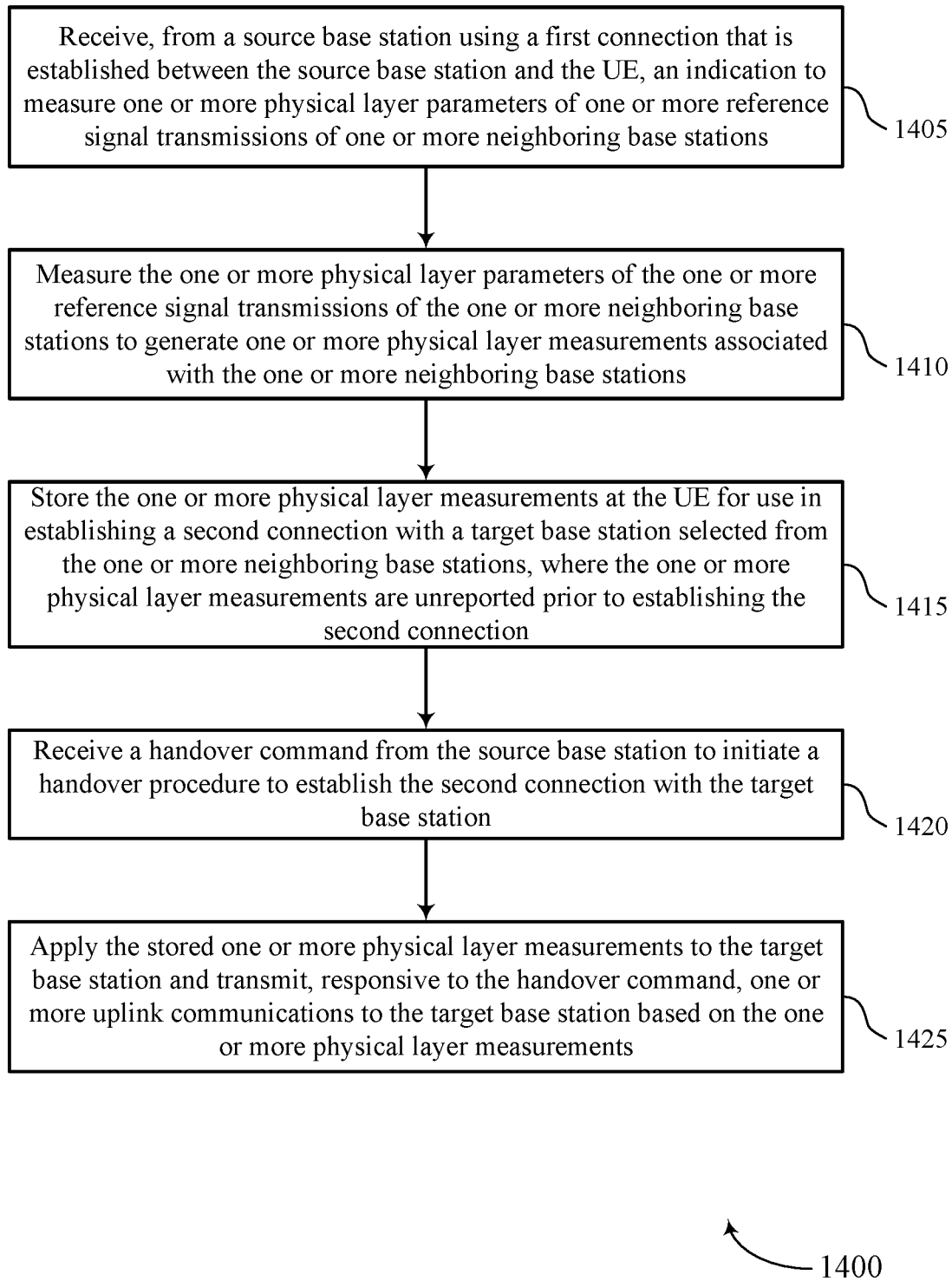

FIG. 14 shows a flowchart illustrating a method 1400 that supports physical layer measurement without reporting for UE mobility in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a source base station using a first connection that is established between the source base station and the UE, an indication to measure one or more physical layer parameters of one or more RS transmissions of one or more neighboring base stations. The operations of 1405 may be performed according to the methods described herein. In some examples, aspects of the operations of 1405 may be performed by a mobility manager as described with reference to FIGS. 5 through 8.

At 1410, the UE may measure the one or more physical layer parameters of the one or more RS transmissions of the one or more neighboring base stations to generate one or more physical layer measurements associated with the one or more neighboring base stations. The operations of 1410 may be performed according to the methods described herein. In some examples, aspects of the operations of 1410 may be performed by a measurement manager as described with reference to FIGS. 5 through 8.

At 1415, the UE may store the one or more physical layer measurements at the UE for use in establishing a second connection with a target base station selected from the one or more neighboring base stations, where the one or more physical layer measurements are unreported prior to establishing the second connection. The operations of 1415 may be performed according to the methods described herein. In some examples, aspects of the operations of 1415 may be performed by a measurement manager as described with reference to FIGS. 5 through 8.

At 1420, the UE may receive a handover command from the source base station to initiate a handover procedure to establish the second connection with the target base station. The operations of 1420 may be performed according to the methods described herein. In some examples, aspects of the operations of 1420 may be performed by a connection establishment manager as described with reference to FIGS. 5 through 8.

At 1425, the UE may apply the stored one or more physical layer measurements to the target base station and transmit, responsive to the handover command, one or more uplink communications to the target base station based on the one or more physical layer measurements. The operations of 1425 may be performed according to the methods described herein. In some examples, aspects of the operations of 1425 may be performed by a connection establishment manager as described with reference to FIGS. 5 through 8.

Figure 15:
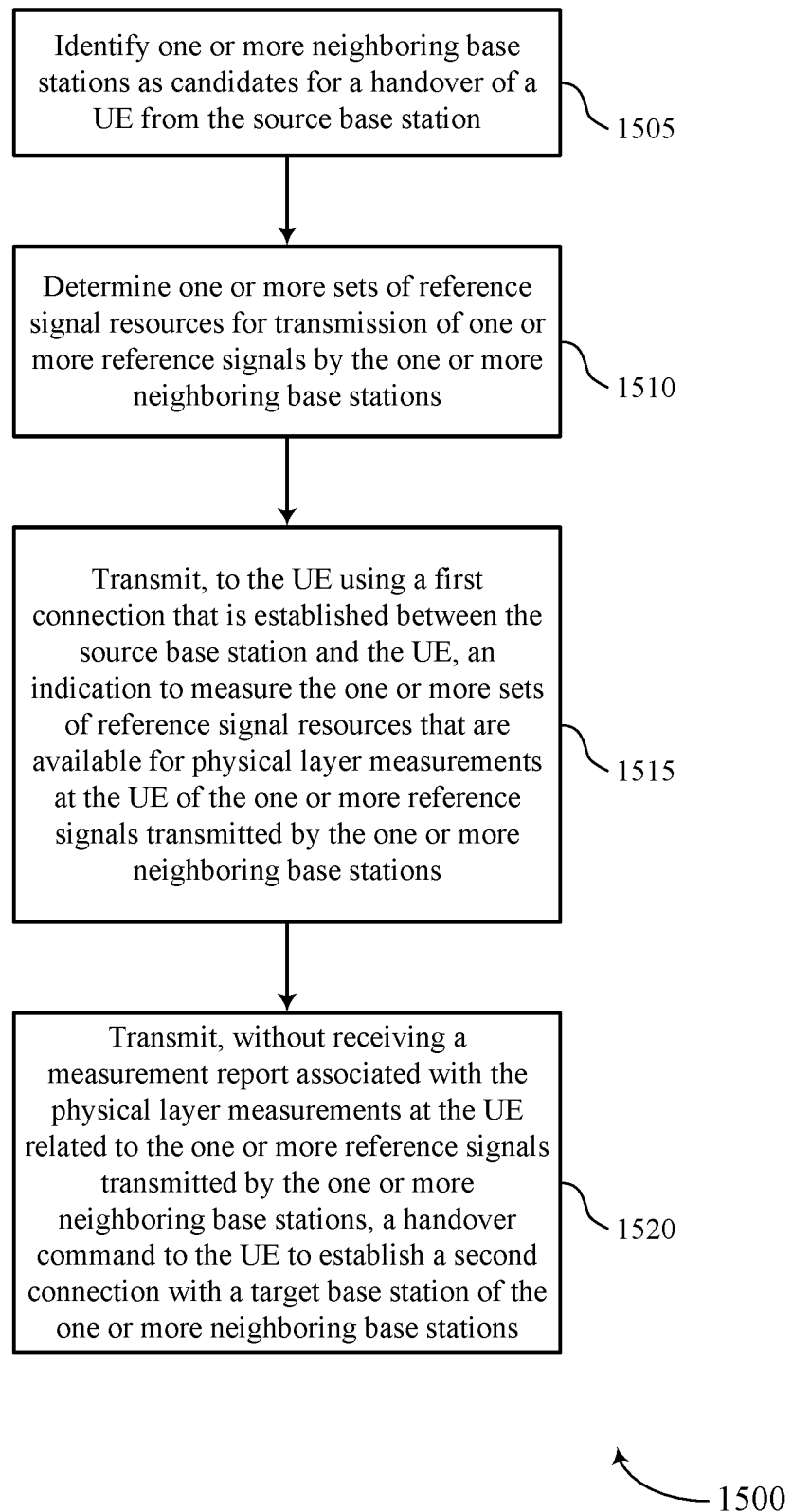

FIG. 15 shows a flowchart illustrating a method 1500 that supports physical layer measurement without reporting for UE mobility in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1505, the base station may identify one or more neighboring base stations as candidates for a handover of a UE from the source base station. The operations of 1505 may be performed according to the methods described herein. In some examples, aspects of the operations of 1505 may be performed by a neighbor identification manager as described with reference to FIGS. 9 through 12.

At 1510, the base station may determine one or more sets of RS resources for transmission of one or more RSs by the one or more neighboring base stations. The operations of 1510 may be performed according to the methods described herein. In some examples, aspects of the operations of 1510 may be performed by a RS coordination manager as described with reference to FIGS. 9 through 12.

At 1515, the base station may transmit, to the UE using a first connection that is established between the source base station and the UE, an indication to measure the one or more sets of RS resources that are available for physical layer measurements at the UE of the one or more RSs transmitted by the one or more neighboring base stations. The operations of 1515 may be performed according to the methods described herein. In some examples, aspects of the operations of 1515 may be performed by a mobility manager as described with reference to FIGS. 9 through 12.

At 1520, the base station may transmit, without receiving a measurement report associated with the physical layer measurements at the UE related to the one or more reference signals transmitted by the one or more neighboring base stations, a handover command to the UE to establish a second connection with a target base station of the one or more neighboring base stations. The operations of 1520 may be performed according to the methods described herein. In some examples, aspects of the operations of 1520 may be performed by a mobility manager as described with reference to FIGS. 9 through 12.

Figure 16:
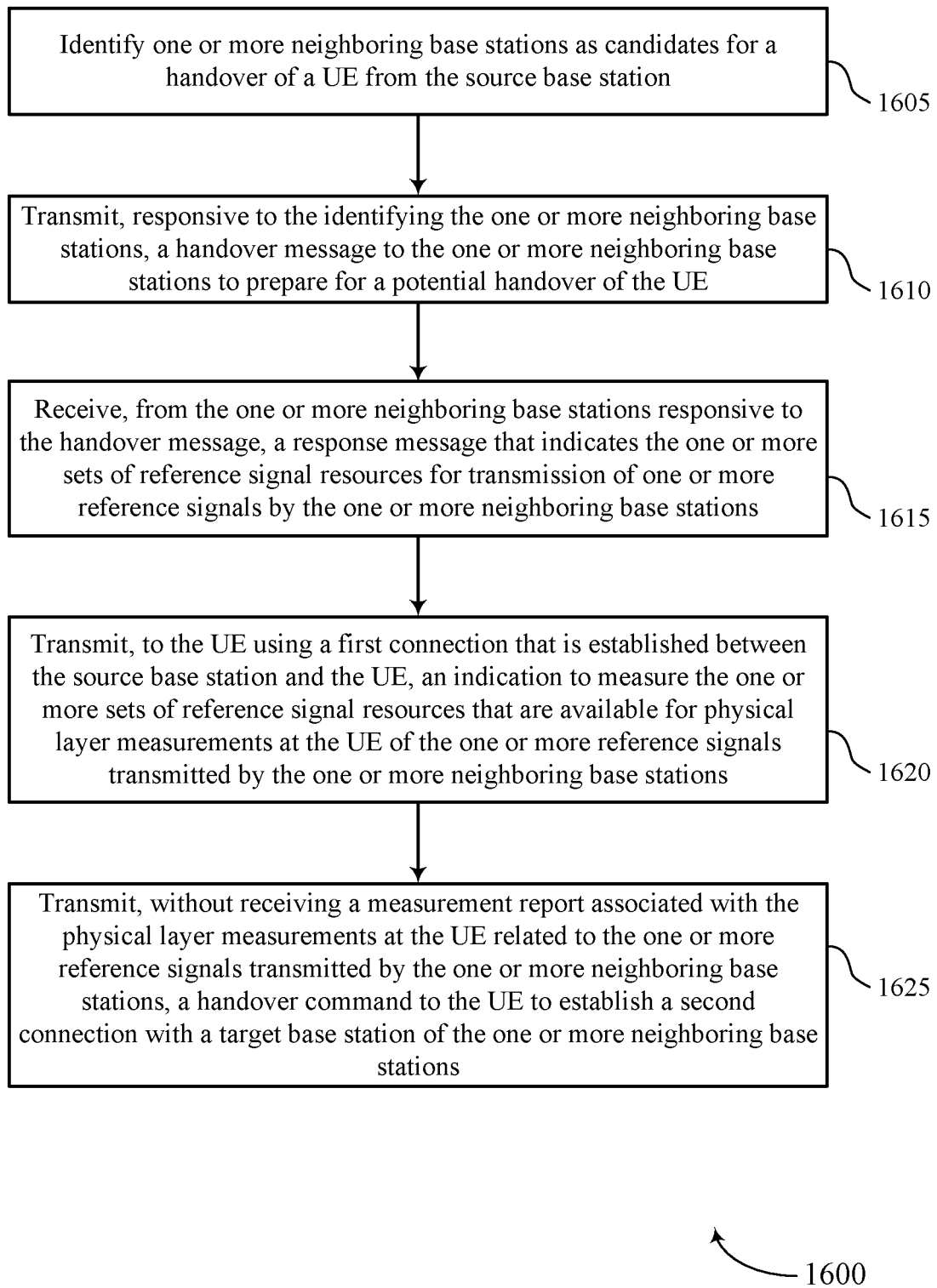

FIG. 16 shows a flowchart illustrating a method 1600 that supports physical layer measurement without reporting for UE mobility in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may identify one or more neighboring base stations as candidates for a handover of a UE from the source base station. The operations of 1605 may be performed according to the methods described herein. In some examples, aspects of the operations of 1605 may be performed by a neighbor identification manager as described with reference to FIGS. 9 through 12.

At 1610, the base station may transmit, responsive to the identifying the one or more neighboring base stations, a handover message to the one or more neighboring base stations to prepare for a potential handover of the UE. The operations of 1610 may be performed according to the methods described herein. In some examples, aspects of the operations of 1610 may be performed by a RS coordination manager as described with reference to FIGS. 9 through 12.

At 1615, the base station may receive, from the one or more neighboring base stations responsive to the handover message, a response message that indicates the one or more sets of RS resources for transmission of one or more RSs by the one or more neighboring base stations. The operations of 1615 may be performed according to the methods described herein. In some examples, aspects of the operations of 1615 may be performed by a RS coordination manager as described with reference to FIGS. 9 through 12.

At 1620, the base station may transmit, to the UE using a first connection that is established between the source base station and the UE, an indication to measure the one or more sets of RS resources that are available for physical layer measurements at the UE of the one or more RSs transmitted by the one or more neighboring base stations. The operations of 1620 may be performed according to the methods described herein. In some examples, aspects of the operations of 1620 may be performed by a mobility manager as described with reference to FIGS. 9 through 12.

At 1625, the base station may transmit, without receiving a measurement report associated with the physical layer measurements at the UE related to the one or more reference signals transmitted by the one or more neighboring base stations, a handover command to the UE to establish a second connection with a target base station of the one or more neighboring base stations. The operations of 1625 may be performed according to the methods described herein. In some examples, aspects of the operations of 1625 may be performed by a mobility manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, the method comprising: receiving, from a source base station using a first connection that is established between the source base station and the UE, an indication to measure one or more physical layer parameters of one or more reference signal transmissions of one or more neighboring base stations; measuring the one or more physical layer parameters of the one or more reference signal transmissions of the one or more neighboring base stations to generate one or more physical layer measurements associated with the one or more neighboring base stations; and storing the one or more physical layer measurements at the UE for use in establishing a second connection with a target base station selected from the one or more neighboring base stations, wherein the one or more physical layer measurements are unreported prior to establishing the second connection.

Aspect 2: The method of aspect 1, further comprising: receiving a handover command from the source base station to initiate a handover procedure to establish the second connection with the target base station; and transmitting, responsive to the handover command, one or more uplink communications to the target base station based at least in part on the one or more physical layer measurements.

Aspect 3: The method of any of aspects 1 through 2, wherein the one or more reference signal transmissions of the one or more neighboring base stations are transmitted using time and frequency resources that are indicated by the source base station.

Aspect 4: The method of any of aspects 1 through 3, wherein the one or more reference signal transmissions include a tracking reference signal (TRS) transmitted by the one or more neighboring base stations, and the one or more physical layer measurements include at least part of time offset measurements, frequency offset measurements, or combinations thereof, that are based at least in part on the TRS.

Aspect 5: The method of aspect 4, wherein the TRS is a periodic or semi-persistent TRS transmitted by the one or more neighboring base stations using time and frequency resources indicated to the UE by the source base station.

Aspect 6: The method of any of aspects 4 through 5, wherein the TRS is an aperiodic TRS that is transmitted in a same downlink transmission that is used to indicate to the UE to select the target base station for a handover procedure.

Aspect 7: The method of any of aspects 1 through 6, wherein the one or more reference signal transmissions include a channel state information reference signal (CSI-RS) transmitted by the one or more neighboring base stations in a selected beam, and the one or more physical layer measurements include at least part of beam refinement measurements for one or more beamforming parameters associated with the selected beam that are based at least in part on the CSI-RS.

Aspect 8: The method of aspect 7, wherein the selected beam is quasi co-located (QCL) with a preferred synchronization signal block (SSB) of each of the one or more neighboring base stations that is reported by the UE to the source base station.

Aspect 9: The method of any of aspects 7 through 8, wherein the CSI-RS is a periodic or semi-persistent CSI-RS transmitted by the one or more neighboring base stations using time and frequency resources indicated to the UE by the source base station.

Aspect 10: The method of any of aspects 7 through 9, wherein the CSI-RS is an aperiodic CSI-RS that is transmitted in a same downlink transmission that is used to indicate to the UE to select the target base station for a handover procedure.

Aspect 11: The method of any of aspects 7 through 10, wherein the CSI-RS includes a repetition parameter that is set to ON to indicate that measurements of the CSI-RS is to be unreported by the UE.

Aspect 12: A method for wireless communication at a source base station, the method comprising: identifying one or more neighboring base stations as candidates for a handover of a UE from the source base station; determining one or more sets of reference signal resources for transmission of one or more reference signals by the one or more neighboring base stations; transmitting, to the UE using a first connection that is established between the source base station and the UE, an indication to measure the one or more sets of reference signal resources that are available for physical layer measurements at the UE of the one or more reference signals transmitted by the one or more neighboring base stations; and transmitting, without receiving a measurement report associated with the physical layer measurements at the UE related to the one or more reference signals transmitted by the one or more neighboring base stations, a handover command to the UE to establish a second connection with a target base station of the one or more neighboring base stations.

Aspect 13: The method of aspect 12, wherein determining one or more sets of reference signal resources for transmission of one or more reference signals by the one or more neighboring base stations further comprises: transmitting, responsive to the identifying the one or more neighboring base stations, a handover message to the one or more neighboring base stations to prepare for a potential handover of the UE; and receiving, from the one or more neighboring base stations responsive to the handover message, a response message that indicates the one or more sets of reference signal resources for transmission of the one or more reference signals by the one or more neighboring base stations.

Aspect 14: The method of any of aspects 12 through 13, wherein the one or more reference signals include a tracking reference signal (TRS) transmitted by the one or more neighboring base stations, and the physical layer measurements include at least part of time offset measurements, frequency offset measurements, or combinations thereof, that are based at least in part on the TRS.

Aspect 15: The method of aspect 14, wherein the TRS is a periodic or semi-persistent TRS transmitted by the one or more neighboring base stations using the one or more sets of reference signal resources indicated to the UE by the source base station.

Aspect 16: The method of any of aspects 14 through 15, wherein the TRS is an aperiodic TRS that is transmitted in a same downlink transmission that is used to transmit the handover command to the UE.

Aspect 17: The method of any of aspects 12 through 16, wherein the one or more reference signals include a channel state information reference signal (CSI-RS) transmitted by the one or more neighboring base stations in a selected beam, and the physical layer measurements include beam refinement measurements for one or more beamforming parameters associated with the selected beam that are based at least in part on the CSI-RS.

Aspect 18: The method of aspect 17, wherein the selected beam is identified based on a preferred synchronization signal block (SSB) of each of the one or more neighboring base stations that is reported by the UE to the source base station.

Aspect 19: The method of any of aspects 17 through 18, wherein the CSI-RS is a periodic or semi-persistent CSI-RS transmitted by the one or more neighboring base stations using the one or more sets of reference signal resources indicated to the UE by the source base station.

Aspect 20: The method of any of aspects 17 through 19, wherein the CSI-RS is an aperiodic CSI-RS that is transmitted in a same downlink transmission that is used to transmit the handover command to the UE.

Aspect 21: The method of any of aspects 17 through 20, wherein the CSI-RS includes a repetition parameter that is set to ON to indicate that measurements of the CSI-RS is to be unreported by the UE.

Aspect 22: An apparatus for wireless communication at a UE, the apparatus comprising a processor; memory coupled with the processor; and instructions stored in the memory and executable by the processor to cause the apparatus to perform a method of any of aspects 1 through 11.

Aspect 23: An apparatus for wireless communication at a UE, the apparatus comprising at least one means for performing a method of any of aspects 1 through 11.

Aspect 24: A non-transitory computer-readable medium storing code for wireless communication at a UE, the code comprising instructions executable by a processor to perform a method of any of aspects 1 through 11.

Aspect 25: An apparatus for wireless communication at a source base station, the apparatus comprising a processor; memory coupled with the processor; and instructions stored in the memory and executable by the processor to cause the apparatus to perform a method of any of aspects 12 through 21.

Aspect 26: An apparatus for wireless communication at a source base station, the apparatus comprising at least one means for performing a method of any of aspects 12 through 21.

Aspect 27: A non-transitory computer-readable medium storing code for wireless communication at a source base station, the code comprising instructions executable by a processor to perform a method of any of aspects 12 through 21.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), the method comprising:
receiving, from a source network device using a first connection between the source network device and the UE, an indication of one or more reference signal resources for transmission of one or more reference signals by a target network device and an indication of a configuration to measure one or more physical layer parameters of the one or more reference signals, wherein the one or more reference signals correspond to a tracking reference signal (TRS) type of a plurality of reference signal types;
receiving, from the target network device, one or more TRSs using the one or more reference signal resources, wherein the one or more TRSs are aperiodic and received in a same downlink transmission that is used to indicate to the UE to select the target network device for a handover procedure;

measuring, based at least in part on the configuration, the one or more physical layer parameters of the one or more TRSs to generate one or more physical layer measurements associated with the target network device, wherein the one or more physical layer measurements comprise one or more frequency offset measurements;

storing the one or more frequency offset measurements at the UE for establishment of a second connection with the target network device, wherein the target network device is from one or more neighboring network devices, and wherein the one or more frequency offset measurements associated with the target network device are unreported prior to the establishment of the second connection.

2. The method of claim 1, further comprising:

receiving a handover command from the source network device to initiate a handover procedure to establish the second connection with the target network device, wherein the one or more uplink communications are transmitted in response to the handover commands; and transmitting, as part of the establishment of the second connection, one or more uplink communications to the target network device according to the one or more frequency offset measurements associated with the target network device stored at the UE.

3. The method of claim 1, wherein the one or more TRSs are received from the one or more neighboring network devices, and wherein the one or more physical layer measurements include time offset measurements based at least in part on the one or more TRSs.

4. The method of claim 1, wherein the one or more reference signals include a channel state information reference signal (CSI-RS) transmitted by the one or more neighboring network devices using a selected beam, and wherein the one or more physical layer measurements include beam refinement measurements for one or more beamforming parameters associated with the selected beam based at least in part on the CSI-RS.

5. The method of claim 4, wherein the selected beam is quasi co-located (QCL) with a preferred synchronization signal block (SSB) of each of the one or more neighboring network devices that is reported by the UE to the source network device.

6. The method of claim 4, wherein the CSI-RS is a periodic or semi-persistent CSI-RS received from the one or more neighboring network devices using the one or more reference signal resources.

7. The method of claim 4, wherein the CSI-RS is an aperiodic CSI-RS that is received in a same downlink transmission that is used to indicate to the UE to select the target network device for a handover procedure.

8. The method of claim 4, wherein the CSI-RS includes a repetition parameter that is set to ON to indicate that measurements of the CSI-RS are to be unreported by the UE.

9. A method for wireless communication at a source network device, the method comprising:

transmitting, to a user equipment (UE) using a first connection between the source network device and the UE, an indication of one or more reference signal resources for transmission of one or more reference signals by a target network device from one or more neighboring network devices that are candidates for handover of the UE from the source network device and an indication of a configuration to measure one or more physical layer parameters of the one or more reference signals, wherein the one or more reference signals correspond to a tracking reference signal (TRS) type of a plurality of reference signal types, and wherein one or more TRSs correspond to the target network device and the one or more TRSs are aperiodic and transmitted in a same downlink transmission that is used to transmit the handover command to the UE;

transmitting, without reception of a measurement report associated with one or more physical layer measurements comprising one or more frequency offset measurements of the one or more TRSs, a handover command to the UE to establish a second connection with the target network device.

10. The method of claim 9, further comprising:

transmitting a handover message to the one or more neighboring network devices to prepare for a potential handover of the UE; and receiving, from the one or more neighboring network devices responsive to the handover message, a response message that indicates the one or more reference signal resources for transmission of the one or more TRSs by the one or more neighboring network devices.

11. The method of claim 9, wherein the one or more physical layer measurements include time offset measurements based at least in part on the one or more TRSs.

12. The method of claim 9, wherein the handover command comprises a trigger for the UE to transmit one or more uplink communications according to the one or more frequency offset measurements of the one or more TRSs associated with the target network device.

13. The method of claim 9, wherein the one or more reference signals include a channel state information reference signal (CSI-RS) transmitted using a selected beam, and wherein the one or more physical layer measurements include beam refinement measurements for one or more beamforming parameters associated with the selected beam based at least in part on the CSI-RS.

14. The method of claim 13, wherein the selected beam is identified based at least in part on a preferred synchronization signal block (SSB) of each of the one or more neighboring network devices that is reported by the UE to the source network device.

15. The method of claim 13, wherein the CSI-RS is a periodic or semi-persistent CSI-RS transmitted using the one or more reference signal resources indicated to the UE by the source network device.

16. The method of claim 13, wherein the CSI-RS is an aperiodic CSI-RS that is transmitted in a same downlink transmission that is used to transmit the handover command to the UE.

17. The method of claim 13, wherein the CSI-RS includes a repetition parameter that is set to ON to indicate that measurements of the CSI-RS are to be unreported by the UE.

18. An apparatus for wireless communication at a user equipment (UE), the apparatus comprising:

one or more processors; and one or more memories coupled with the one or more processors, the one or more memories comprising instructions executable by the one or more processors individually or collectively to cause the apparatus to:

receive, from a source network device using a first connection between the source network device and the UE, an indication of one or more reference signal resources for transmission of one or more reference signals by a target network device and an indication of a configuration to measure one or more physical layer parameters of the one or more reference signals, wherein the one or more reference signals correspond to a tracking reference signal (TRS) type of a plurality of reference signal types;

receive, from the target network device, one or more TRSs using the one or more reference signal resources, wherein the one or more TRSs are aperiodic and received in a same downlink transmission that is used to indicate to the UE to select the target network device for a handover procedure;

measure, based at least in part on the configuration, the one or more physical layer parameters of the one or more TRSs to generate one or more physical layer measurements associated with the target network device, wherein the one or more physical layer measurements comprise one or more frequency offset measurements;

store the one or more frequency offset measurements at the UE for establishment of a second connection with the target network device, wherein the target network device is from one or more neighboring network devices, and wherein the one or more frequency offset measurements associated with the target network device are unreported prior to the establishment of the second connection.

19. The apparatus of claim 18, wherein the instructions are further executable by the one or more processors individually or collectively to cause the apparatus to:

receive a handover command from the source network device to initiate a handover procedure to establish the second connection with the target network device, wherein the one or more uplink communications are transmitted in response to the handover command; and transmit, as part of the establishment of the second connection, one or more uplink communications to the target network device according to the one or more frequency offset measurements associated with the target network device stored at the UE.

20. The apparatus of claim 18, wherein the one or more TRSs are received from the one or more neighboring network devices, and wherein the one or more physical layer measurements include at least part of time offset measurements based at least in part on the one or more TRSs.

21. The apparatus of claim 18, wherein the one or more reference signals include a channel state information reference signal (CSI-RS) transmitted by the one or more neighboring network devices using a selected beam, and wherein the one or more physical layer measurements include beam refinement measurements for one or more beamforming parameters associated with the selected beam based at least in part on the CSI-RS.

22. The apparatus of claim 21, wherein the selected beam is quasi co-located (QCL) with a preferred synchronization signal block (SSB) of each of the one or more neighboring network devices that is reported by the UE to the source network device.

23. The apparatus of claim 21, wherein the CSI-RS is a periodic or semi-persistent CSI-RS received from the one or more neighboring network devices using the one or more reference signal resources.

24. The apparatus of claim 21, wherein the CSI-RS is an aperiodic CSI-RS that is received in a same downlink transmission that is used to indicate to the UE to select the target network device for a handover procedure.

25. The apparatus of claim 21, wherein the CSI-RS includes a repetition parameter that is set to ON to indicate that measurements of the CSI-RS are to be unreported by the UE.

26. An apparatus for wireless communication at a source network device, the apparatus comprising:

one or more processors; and one or more memories coupled with the one or more processors, the one or more memories comprising instructions executable by the one or more processors individually or collectively to cause the apparatus to:

transmit, to a user equipment (UE) using a first connection between the source network device and the UE, an indication of one or more reference signal resources for transmission of one or more reference signals by a target network device from one or more neighboring network devices that are candidates for handover of the UE from the source network device and an indication of a configuration to measure one or more physical layer parameters of the one or more reference signals, wherein the one or more reference signals correspond to a tracking reference signal (TRS) type of a plurality of reference signal types, one or more TRSs corresponds to the target network device, and the one or more TRSs are aperiodic and transmitted in a same downlink transmission that is used to transmit the handover command to the UE; and transmit, without reception of a measurement report associated with one or more physical layer measurements comprising one or more frequency offset measurements of the one or more TRSs, a handover command to the UE to establish a second connection with the target network device.

27. The apparatus of claim 26, wherein the instructions are further executable by the one or more processors individually or collectively to cause the apparatus to:

transmit, a handover message to the one or more neighboring network devices to prepare for a potential handover of the UE; and receive, from the one or more neighboring network devices responsive to the handover message, a response message that indicates the one or more reference signal resources for transmission of the one or more TRSs by the one or more neighboring network devices.

28. The apparatus of claim 26, wherein the one or more physical layer measurements include time offset measurements based at least in part on the one or more TRSs.

29. The apparatus of claim 26, wherein the handover command comprises a trigger for the UE to transmit one or more uplink communications according to the one or more frequency offset measurements of the one or more TRSs associated with the target network device.

30. The apparatus of claim 26, wherein the one or more reference signals include a channel state information reference signal (CSI-RS) transmitted using a selected beam, and wherein the one or more physical layer measurements include beam refinement measurements for one or more beamforming parameters associated with the selected beam based at least in part on the CSI-RS.

31. The apparatus of claim 30, wherein the selected beam is identified based at least in part on a preferred synchronization signal block (SSB) of each of the one or more neighboring network devices that is reported by the UE to the source network device.

32. The apparatus of claim 30, wherein the CSI-RS is a periodic or semi-persistent CSI-RS transmitted using the one or more reference signal resources indicated to the UE by the source network device.

33. The apparatus of claim 30, wherein the CSI-RS is an aperiodic CSI-RS that is transmitted in a same downlink transmission that is used to transmit the handover command to the UE.

34. The apparatus of claim 30, wherein the CSI-RS includes a repetition parameter that is set to ON to indicate that measurements of the CSI-RS are to be unreported by the UE.

* * * * *